(12) United States Patent
Ansell

(10) Patent No.: US 12,729,785 B2
(45) Date of Patent: Sep. 8, 2026

(54) PLUMBING CONNECTOR

(71) Applicant: RELIANCE WORLDWIDE CORPORATION (UK) LIMITED, London (GB)

(72) Inventor: Glen Ansell, London (GB)

(73) Assignee: Reliance Worldwide Corporation (UK) Limited, Middlesex (GB)

( * ) Notice: Subject to any disclaimer, the term of this patent is extended or adjusted under 35 U.S.C. 154(b) by 254 days.

(21) Appl. No.: 18/006,396

(22) PCT Filed: Jul. 15, 2021

(86) PCT No.: PCT/GB2021/051821
§ 371 (c)(1),
(2) Date: Jan. 23, 2023

(87) PCT Pub. No.: WO2022/018412
PCT Pub. Date: Jan. 27, 2022

(65) Prior Publication Data

US 2023/0265952 A1 Aug. 24, 2023
US 2026/0098600 A9 Apr. 9, 2026

(30) Foreign Application Priority Data

Jul. 23, 2020 (GB) ...................................... 2011438
Jul. 23, 2020 (GB) ...................................... 2011440

(51) Int. Cl.
*F16L 33/22* (2006.01)
*F16L 47/04* (2006.01)

(52) U.S. Cl.
CPC ............. *F16L 33/224* (2013.01); *F16L 47/04* (2013.01); *F16L 2201/10* (2013.01)

(58) Field of Classification Search
CPC ....... F16L 33/223; F16L 33/224; F16L 47/04; F16L 2201/10
See application file for complete search history.

(56) References Cited

U.S. PATENT DOCUMENTS 4,253,686 A * 3/1981 Aitken .................... F16L 47/04
5,275,447 A * 1/1994 McNab ................. F16L 33/223
(Continued)

FOREIGN PATENT DOCUMENTS

AU 2017267178 C1 11/2017
DE 9414523 U1 11/1994
(Continued)

OTHER PUBLICATIONS

Search Report; British Patent Application No. 2011438.5; Apr. 6, 2021.

(Continued)

*Primary Examiner* — Zachary T Dragicevich
(74) *Attorney, Agent, or Firm* — Barnes & Thornburg LLP

(57) ABSTRACT

A pipe connector having a body with a tubular part to seal with a pipe. The tubular part has an outer face with a projecting feature to seal with the pipe. A collet is fixed to the body and spaced from the tubular part to form a cavity for the pipe. A locking cap is captive on and screwed onto collet to deflect the collet onto the pipe and the pipe onto the tubular part to seal between the body and the pipe. The collet has through slots at its distal end allowing the pipe to be visible when the connector is locked and unlocked. The inner diameter at an open end of the collet is optionally greater than the inner diameter of the distal part that receives the pipe. A method of forming the connector is also disclosed.

17 Claims, 22 Drawing Sheets

(56) References Cited

U.S. PATENT DOCUMENTS

| | | | | |
|---|---|---|---|---|
| 8,141,913 | B2 | 3/2012 | Kern-Emmerich et al. | |
| 8,256,802 | B2 * | 9/2012 | Werth | F16L 33/225 |
| 9,234,611 | B2 | 1/2016 | Arning et al. | |
| 9,671,049 | B1 | 6/2017 | Crompton et al. | |
| 9,803,786 | B2 | 10/2017 | Bohl et al. | |
| 10,267,441 | B2 | 4/2019 | Hallen | |
| 10,480,699 | B2 | 11/2019 | Meister et al. | |
| 10,865,932 | B2 | 12/2020 | Inha et al. | |
| 10,927,984 | B2 | 2/2021 | Rischen et al. | |
| 2004/0041399 | A1 * | 3/2004 | Chelchowski | F16L 47/04 |
| 2014/0252760 | A1 * | 9/2014 | Paul | F16L 33/224 |
| 2020/0182387 | A1 * | 6/2020 | Morrissey | F16L 33/223 |

FOREIGN PATENT DOCUMENTS

| | | | |
|---|---|---|---|
| DE | 502007002902 | | 6/2008 |
| DE | 102007008066 | A1 | 8/2008 |
| DE | 102015115890 | A1 | 3/2017 |
| DE | 102016116652 | A1 | 3/2018 |
| EP | 0168260 | A2 | 1/1986 |
| EP | 0206582 | A2 | 12/1986 |
| EP | 1243841 | A1 | 9/2002 |
| EP | 1859189 | A1 | 11/2007 |
| EP | 1893903 | A1 | 3/2008 |
| EP | 2020552 | A1 | 2/2009 |
| EP | 2053292 | A1 | 4/2009 |
| EP | 2193303 | A1 | 6/2010 |
| EP | 2411721 | A1 | 2/2012 |
| EP | 2522894 | A1 | 11/2012 |
| EP | 2677224 | A1 | 12/2013 |
| EP | 2927553 | A1 | 10/2015 |
| EP | 2956254 | A1 | 12/2015 |
| EP | 3115671 | A1 | 1/2017 |
| EP | 3265711 | A1 | 1/2018 |
| EP | 3361134 | A1 | 8/2018 |
| EP | 3379129 | A1 | 9/2018 |
| EP | 3617569 | A1 | 3/2020 |
| ES | 2458100 | T3 | 4/2014 |
| ES | 2544765 | T3 | 9/2015 |
| GB | 1599285 | | 9/1981 |
| IN | 358168 | B | 6/2010 |
| JP | 856126114 | A | 10/1981 |
| JP | 2011247335 | A | 12/2011 |
| KR | 1646489 | B1 | 10/2011 |
| KR | 1016464890000 | B1 | 8/2016 |
| MX | 2011002785 | A | 4/2011 |
| MX | 327260 | B | 1/2015 |
| WO | 2011099519 | A1 | 8/2011 |
| WO | 2015029815 | A1 | 3/2015 |
| WO | 2015089583 | A2 | 6/2015 |
| WO | 2022018412 | A2 | 1/2022 |
| WO | 2022018413 | A1 | 1/2022 |

OTHER PUBLICATIONS

Search Report; British Patent Application No. 2011440.1; Apr. 6, 2021.

Search Report and Written Opinion; International Patent Application No. PCT/GB2021/051821; Jan. 24, 2022.

Search Report and Written Opinion; International Patent Application No. PCT/GB2021/051822; Oct. 12, 2021.

* cited by examiner 312
34
15
311

35
35
3
A
1
34
3
35
35
31
11

35
35

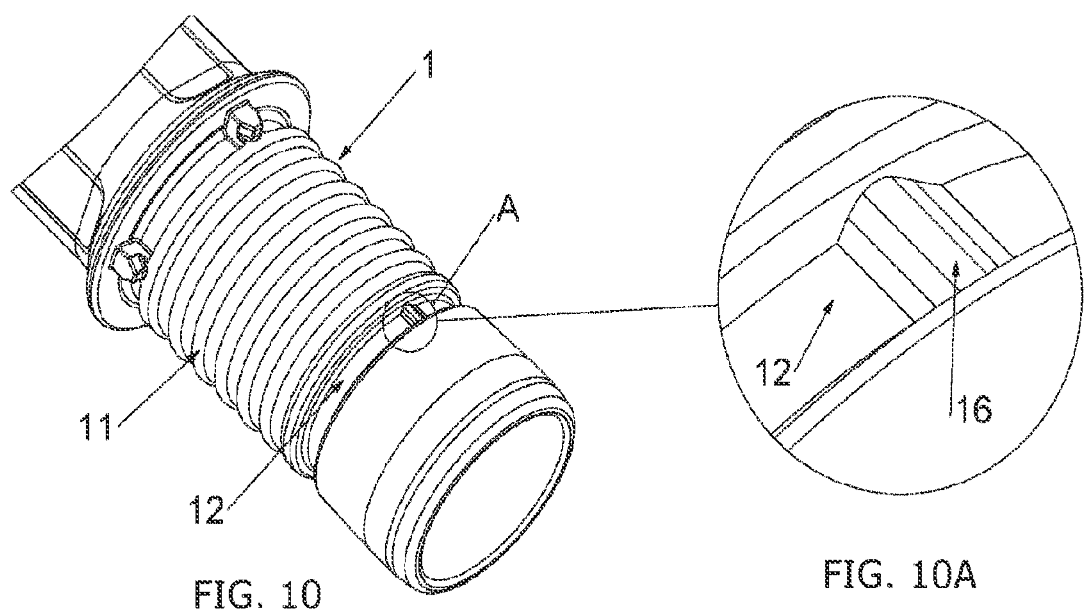
FIG. 10
FIG. 10A
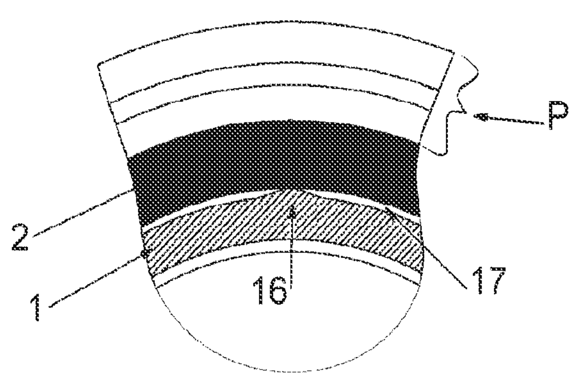
FIG. 10B
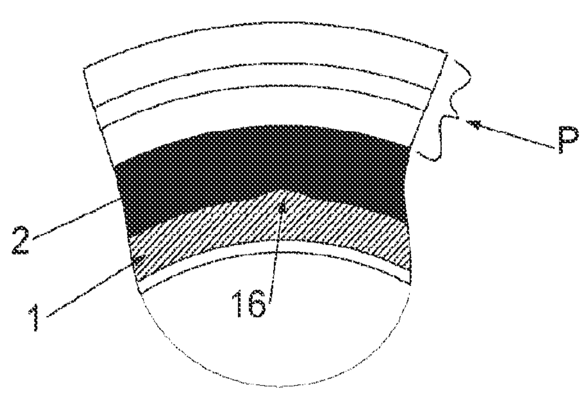
FIG. 10C

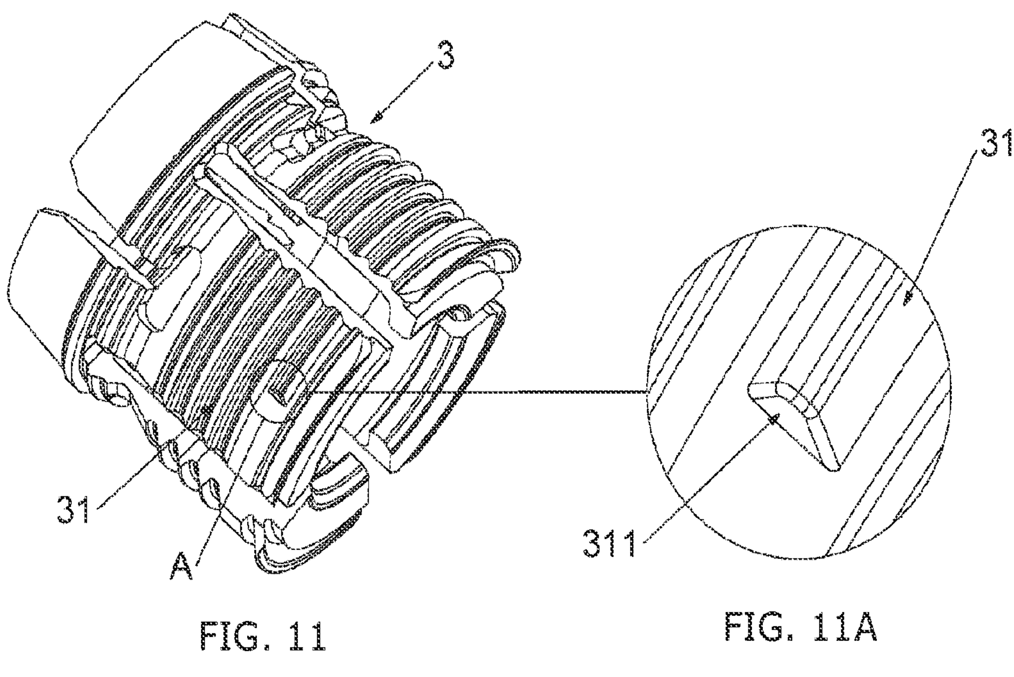
FIG. 11
FIG. 11A
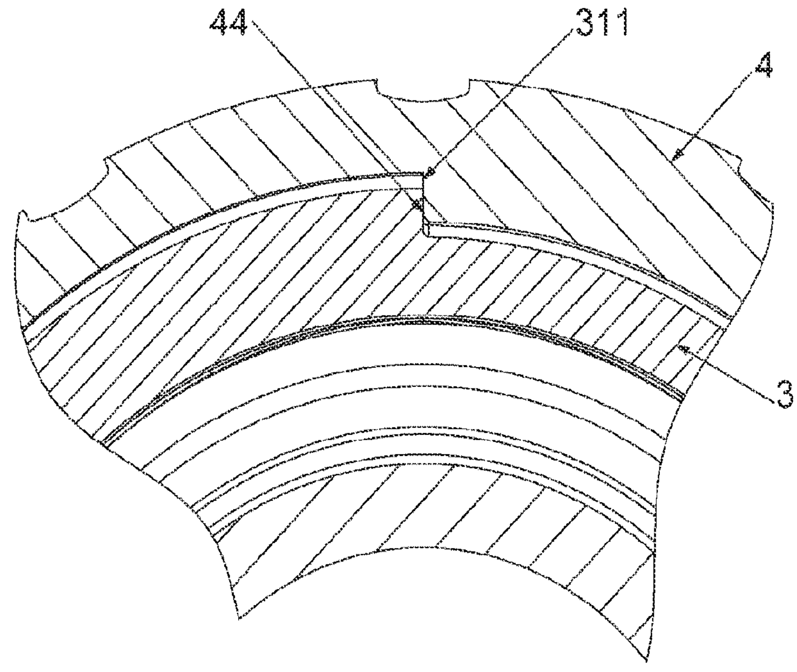
FIG. 11B 308
302
307

300
3
4
2
1
A 303
306

A 305
308
309
302
307
303
306
304

300
301
A

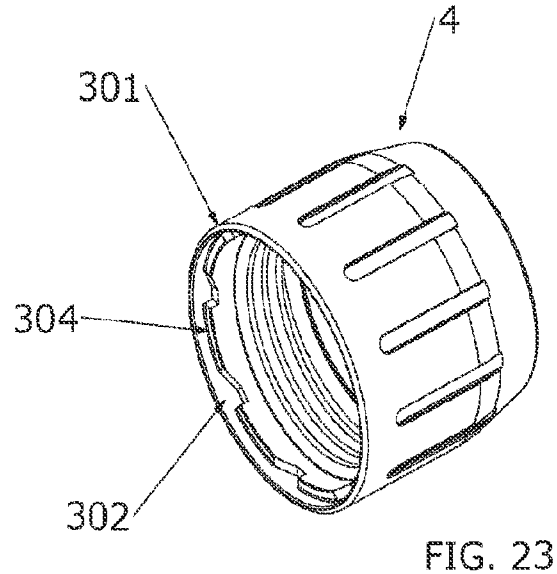
FIG. 23
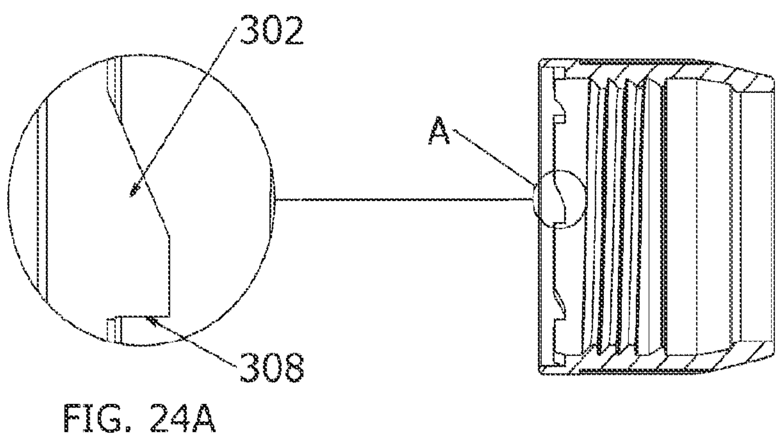
FIG. 24A
FIG. 24

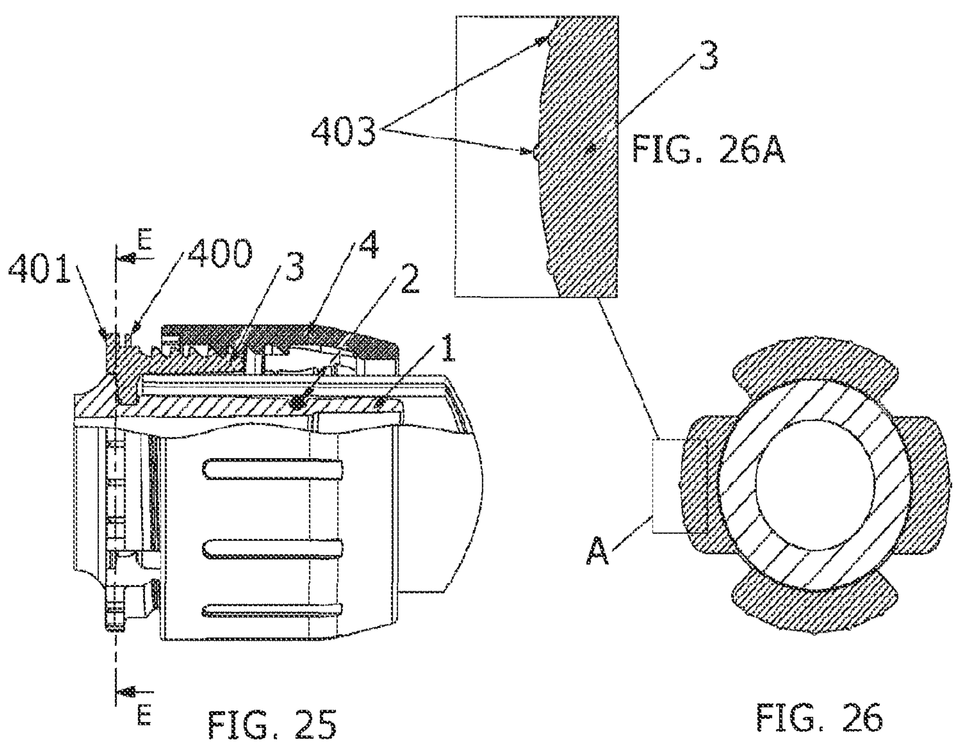
FIG. 25
FIG. 26
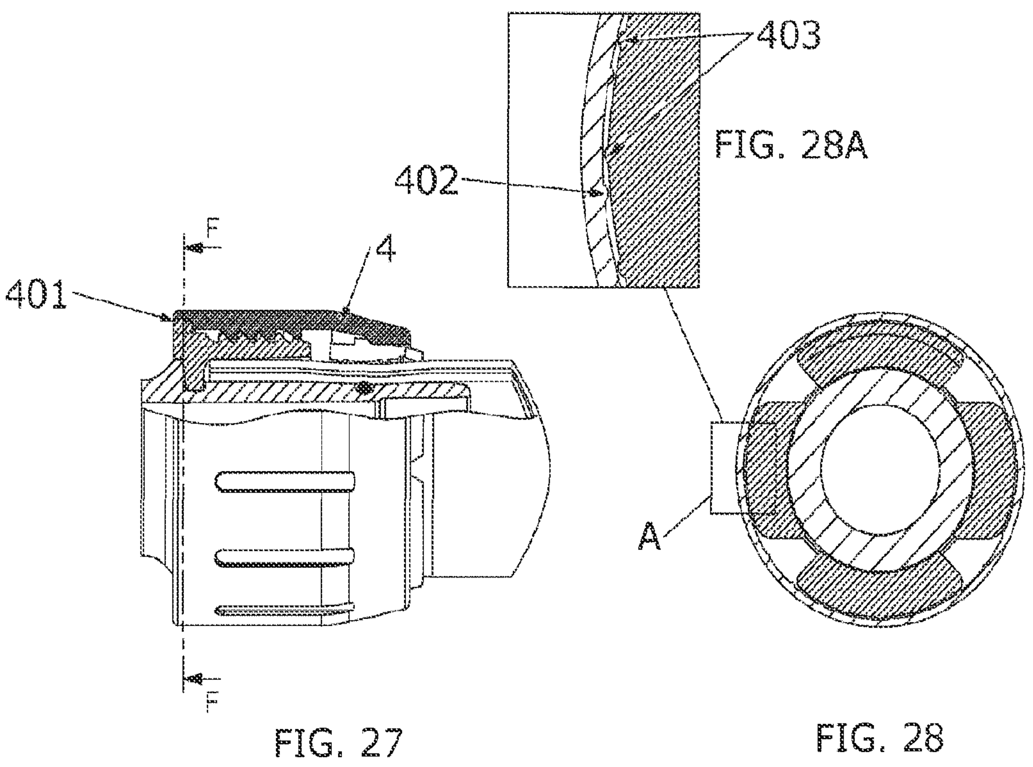
FIG. 27
FIG. 28

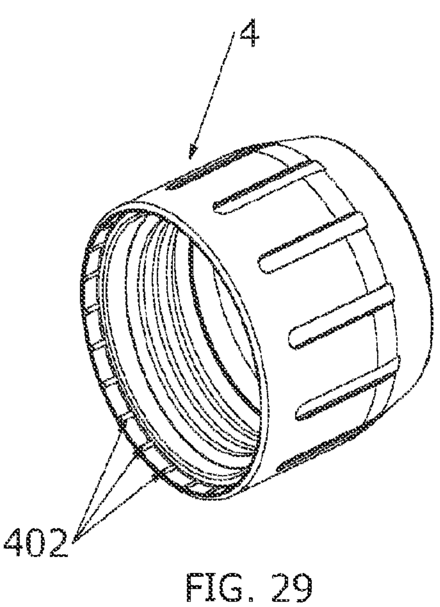
FIG. 29
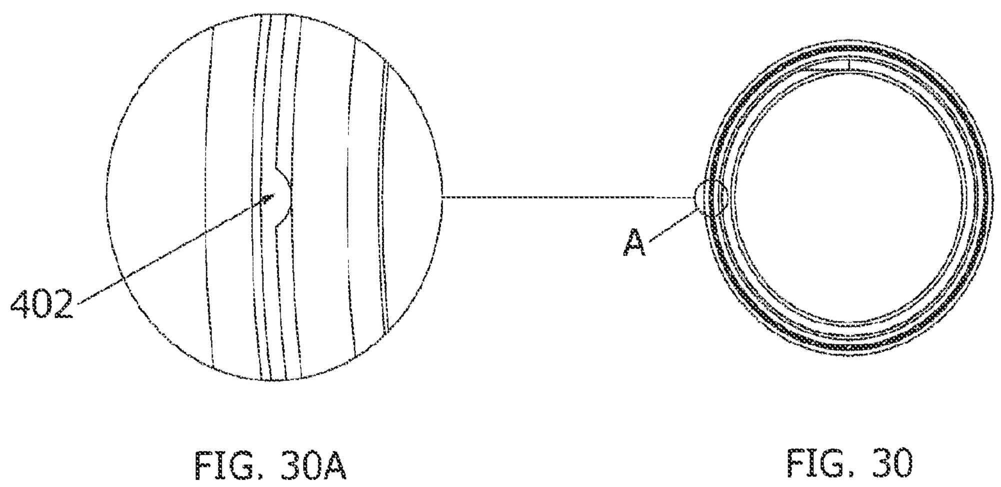
FIG. 30A
FIG. 30

PLUMBING CONNECTOR

PRIORITY CLAIM

This patent application is a U.S. National Phase of International Patent Application No. PCT/GB2021/051821, filed Jul. 15, 2021, which claims priority to British Patent Application No. 2011438.5, filed Jul. 23, 2020, and International Patent Application No. PCT/GB2021/051822, filed Jul. 15, 2021, which claims priority to British Patent Application No. 2011440.1, filed Jul. 23, 2020, the disclosures of which are incorporated herein by reference in their entireties.

SUMMARY

The present disclosure relates to a plumbing connector for use with plastic pipe. More specifically, it relates to a connector suitable for use with multi layered pipe (MLCP) for heating and hot/cold water systems.

Such connectors are used routinely in commercial developments such as hotels, schools, offices and the like.

These connectors are inside diameter (ID) connectors such that they have a body which fits inside the pipe and seals on the inner wall of the pipe. This is primarily done because these multi layered pipes have a laminated structure and the pipe may tend to delaminate in the vicinity of a cut end. This cut end would be exposed to the fluid within the pipe if the seal were made with the outer diameter of the pipe. The liquid could cause further separation of the layers and ultimately cause a failure in the vicinity of the joint. By sealing on the inner diameter of the pipe, the cut end of the pipe is on the "dry" side of the seal such that this does not occur.

In commercial plumbing, MLCP connectors are overwhelmingly of a press-fit type. Such a connector has an inner sleeve over which the pipe is fitted and an outer sleeve which is plastically deformed by pressing (hence the term 'press-fit') in order to compress the body of the connector onto the pipe and, in the process, pressing the pipe onto a seal in the body.

These press fit joints suffer from a number of disadvantages.

In order to compress the connector onto the pipe, a power tool is required. This is a relatively large tool which can be awkward to manipulate. As these connectors are often used in situations where space is limited, or where access is difficult, this makes it difficult to apply and manipulate the tool. This may limit the places where pipes can be placed, or may require a larger volume to be set aside for the pipe and connector. This becomes more of a problem as the pipes are scaled up as more force is required to compress larger diameter connectors.

Many of these types of connectors have a visual indication to show that the crimping has taken place. This may, for example, be in the form of a plastic ring which will fall off the connector once the crimping tool has been applied. Although this provides a visual indication that the crimping tool has been applied, there is no guarantee that the crimping operation has been carried out correctly and that the joint is now sound.

In order to insert the end of the pipe into such a connector, it is necessary to ensure that the end of the pipe is in an appropriate state. In particular, it is necessary to remove any burrs which are formed on the end of the pipe during the cutting operation. However, the press fit connector is designed to have a fairly low clearance in relation to the diameter of pipe with which it is intended to be used. This cuts down the amount of deformation required during the crimping operation as it would otherwise require an impractically high force and create internal stresses on the connector material if it was necessary to deform the material too much during the crimping operation. As such, a chamfer has to be cut onto the inner and outer leading edges of the pipe in order to aid its insertion into the connector. This can be relatively time consuming and, if not done properly, it can create difficulties in making the connection.

This relatively tight interface prior to the crimping of the connector creates a further problem. Such joints are typically pressure tested once an installation is complete in order to test the integrity of the joints. Given that the inner diameter of the pipe is relatively similar to the diameter within the connector on which it seals, it is possible for the joint to pass a pressure test even though the crimping operation has not been carried out or has been carried out incorrectly.

Because the crimping operation plastically deforms the material of the connector, this type of connector is not demountable. Although this may not be a problem for many applications, it limits the use of such connectors to situations where they do not need to be reused.

Another type of connector used for this purpose is the push-fit connector. In contrast to a press-fit connector which relies on plastically deforming the material of the connector, in a push-fit connector the pipe is simply pushed into the end of the connector whereupon the gripping and sealing happens automatically. The connector body has a central portion with a sealing ring which seals on the inside diameter of the pipe.

An example of this is the Wavin smartFIX connector. The body contains a gripper with inner and outer portions which engage with both the inside diameter and the outside diameter of the pipe. The grab ring is spring-loaded to urge it towards the open end of the connector. The outermost part of the connector has a ramped surface which engages with a complementary ramped surface on the gripper so that any force tending to pull the pipe out of the connector would cause these ramped surfaces to engage one another thereby providing an increasing gripping force on the pipe. The outer part of the body is provided with a pair of windows so that the pipe is visible through the connector wall.

WO2015/089583 shows a further push-fit connector suitable for sealing the inside diameter of a plastic or MLCP plumbing pipe. This has a grab ring to hold the pipe in place. A collet is provided, but this is simply to retain an outer sleeve. As with the above-mentioned Wavin connector, this is not demountable. A coloured ring is provided within the connector which is pushed along the connector by the insertion of a pipe and is visible through slots at the distal end of the connector.

These push-fit connectors suffer from a number of problems. The connector is not designed to allow the pipe to be removed so that as with the above-mentioned press-fit connectors they cannot be reused.

In the field of commercial plumbing, installers are used to the idea of using a tool to complete the connection. There is, therefore, an instinctive mistrust of a connector in which the push-fit connection happens automatically without the application of a tool. The way that a push-fit connector operates means that is has to allow axial movement of the pipe in the connector to engage the gripping. Again, this is not popular as it gives an impression of a joint that is not secure.

Further, there is no way to verify that the connection has actually been carried out correctly. In the Wavin smartFIX connector, the windows are relatively small and therefore need to be inspected close up to determine whether the pipe is in place. The windows are a reasonable distance from the end of the pipe such that the window can only be used to verify that the pipe is part-way inside the connector. In WO2015/089583 the coloured ring is also not a reliable indication of the position of the pipe within the connector as it is possible that the ring and the pipe can separate from one another. Under these circumstances, a visual indication of the position of the ring gives a false impression of the position of the end of the pipe.

Both of the above described push-fit connectors, also suffer from the problem set out above concerning the quality of the finish on the cut end of the pipe. Because they rely on components within the connector which can only move with respect to one another in response to movement of the pipe within the connector, the tolerances within the connector again need to be relatively tight so that the deflections required to grip the pipe can provide an adequate gripping force within a short amount of axial travel. Because of this, the end of the pipe must be de-burred and chamfered at both leading edges in order to be able to be inserted within the connector. Even then, the insertion force is likely to be relatively high as the insertion is resisted, to some extent, by the presence of the sealing ring.

Press fit connectors do not scale up well given the additional force needed to deform the material of a larger connector. However, larger sizes of push fit connector are even more difficult to use due to the effort needed to push pipe through the gripper and O-ring.

There is also prior art in the separate field of domestic hose connectors. Such a connectors have been known for decades. An example is disclosed in EP0206582. This shows a connector body with integral fingers to clamp onto the hose pipe. We are also aware of a number of connectors made by Hozelock where there is an inner core which fits within the end of the hose and a separate connection grip which has teeth to grip the hose when a cap is screwed onto the grip component.

It should be noted, however, that these connectors are from a field with fundamentally different requirements from those of the present disclosure. A domestic hose connector is designed to operate at ambient temperatures. By contrast, plumbing connectors are required to connect pipes that carry hot water which is typically at a temperature of at a continuous temperature of 95° C., and above 100° C. for short periods.

Other connectors are known in different fields. For example, WO 2011/099519 discloses a metal connector for connecting with the braided hose. Such braided hoses have a much higher degree of deformability than the pipes which are addressed by the present disclosure. As such, good sealing and gripping can be provided by the higher degree of deflection of the material of the hose itself. This places very different requirements on the connector to those of the present disclosure. A similar connector is disclosed in JP 2011/247335.

EP 0168260 describes a plastic connector which is again suited to a highly flexible hose. This has a large recess surrounding an outer face of the tubular body, into which the hose is deflected to a significant extent by the collet.

The object of the present disclosure is to address one or more of the above-mentioned problems.

According to a first aspect of the present disclosure, there is provided a pipe connector for a commercial plumbing pipe comprising:

a hollow body made of plastic having a central throughway defining an axis, the body comprising a tubular part at at least one end, the tubular part having an outer face with at least one projecting feature to seal, in use, with an inner diameter of a pipe placed over the tubular part:

a collet made of plastic fitted over the tubular part of the body so as to be axially fixed with respect to the body and being spaced from the tubular part to form a cavity for the pipe, the inner face of the collet having at least one tooth to grip the pipe, in use, and the outer face of the collet having a first screw thread; and a locking cap made of plastic fitted over the collet and having an inner face with a second screw thread which is complementary to the first screw thread, wherein screwing the locking cap onto the collet from an unlocked configuration to a locked configuration causes inward deflection of the collet to press, in use, the collet onto the pipe and the pipe onto the tubular part to seal the interface between the body and the pipe.

The presence of the locking cap which deflects the collet onto the pipe means that a greater degree of inward deflection of the collet can be provided as opposed to the press-fit and push-fit connectors described above. This greater degree of deflection means that the initial opening between the body and the collet can be larger than in the prior art such that there is no need for a chamfer on the cut end of the pipe making the connection process much quicker. It can also provide a lower insertion force so that it is easier to insert the pipe into the connector.

The presence of the locking cap which needs to be rotated to secure the joint means that this is not a 'push-fit' connector as it cannot be made up just by pushing the pipe into the connector. The force required to screw the locking cap into place could be made large enough that it requires the use of a tool. This would help the connector to gain acceptance in the commercial plumbing sector. Such a tool can be smaller and cheaper than the tools required of the above press fit connectors as it is required to perform a screwing action not a crimping action. It can therefore be a simple wrench. Alternatively, the force required to screw the locking cap into place could be made low enough so that the joint can be made up by hand.

Because of the mechanical advantage gained from the screw threaded locking cap, the present disclosure is easily scalable as larger connectors need only slightly more closing torque than smaller ones.

The locking cap is in a first position relative to the collet when unlocked and a second position when locked. This provides a clear visual indication of the state of the connector which can be readily identified from a distance.

The connector can be made as a single use connector if the locking cap is unable to be screwed back from the locked position. However, it can also readily be made demountable provided that the locking cap is able to be unscrewed.

The present disclosure therefore provides numerous and significant benefits over all of the prior art currently available in the field of connectors or ID connectors for plumbing applications.

The material used in a domestic hose is fundamentally different from the material used in commercial plumbing pipes and this has a significant effect on the manner in which the connector seals to the pipe. In a hose, the material is relatively easily deformable and therefore is sealed by being forced over and expanded onto the connector body. As such, the projecting feature on the tubular body to provide sealing is a hindrance to the sealing of such a connector which is likely to be made up many times over the lifetime of the connector.

The present disclosure differs from WO 2011/099519 and JP 2011/247335 which are metal connectors designed for a different purpose as set out above. Similarly, EP0168260 has a large groove in the hollow body and does not have teeth on the collet. The gripping is carried out by deflecting the flexible tube into a groove on the tubular part. None of these references discloses that the locking cap is captive on the collet.

As a matter of practicality, all of the above-mentioned problems described in relation to the commercial plumbing do not arise in a hose connector. This, together with the fundamentally different operating conditions and manner of sealing mean that, in practice, a hose connector cannot be used in a commercial plumbing environment.

Preferably, in the unlocked configuration, the inner diameter of a first constriction at an open end of the collet is greater than the inner diameter of the distal part of the collet that receives the pipe distally of the sealing ring. This contrasts with the prior art where the collet is narrowest towards its open end so that the pipe entering the connector deflects the open end of the collet outwardly. This ensures that the collet legs are naturally biased towards the pipe, once in place, to provide enhanced gripping of the pipe but it does make it more difficult to get the pipe into the collet. The present arrangement prioritises the ease of connection recognising that greater deflection of the collet can readily be provided by the locking cap. This allows the pipe to be more easily inserted into the collet which is wider at its open end and reduces in diameter deeper into the collet. It also reduces the possibility of part of the collet being damaged by being deflected inwardly on insertion of the pipe which can destroy the integrity of the connection.

This forms a second aspect of the disclosure which is a pipe connector comprising:

- a hollow body having a central throughway defining an axis, the body comprising a tubular part at at least one end, the tubular part having an outer face to seal, in use, with an inner diameter of a pipe placed over the tubular part:
- a collet fitted over the tubular part of the body so as to be axially fixed with respect to the body and being spaced from the tubular part to form a cavity for the pipe, the inner face of the collet having at least one tooth to grip the pipe, in use, and the outer face of the collet having a first screw thread; and
- a locking cap fitted over the collet and having an inner face with a second screw thread which is complementary to the to the first screw thread, wherein screwing the locking cap onto the collet from an unlocked configuration to a locked configuration causes inward deflection of the collet to press, in use, the collet onto the pipe and the pipe onto the tubular part to seal the interface between the body and the pipe;
- wherein in the unlocked configuration, the inner diameter of a first constriction at an open end of the collet is greater than the inner diameter of the distal part of the collet that receives the pipe.

This may be used in conjunction with any of the optional features of the first aspect of the disclosure.

In order to enhance the gripping force on the pipe, the collet has two sets of teeth, the sets being axially spaced from one another. Preferably, between the two sets of teeth, the inner wall of the collet bulges inwardly. This enhances the compressive force on the pipe.

Preferably, in use, in the locked configuration, there is no axial movement between the body, collet, locking cap and pipe. This improves on a push fit connector where the pipe can move axially with the collet in the connector such that the connection does not feel as secure to an installer.

The connector is preferably capable of maintaining the seal when exposed to a continuous temperature of 70° C., preferably 80° C. and more preferably 90° C. A domestic hose connector cannot operate at these temperatures. The connector should preferably be able to meet ISO 21003.

Preferably, the tubular part has a groove retaining an elastically deformable sealing ring to provide the seal, in use, with the inner diameter of the pipe placed over the tubular part.

The elastically deformable sealing ring is unnecessary and unsuitable for a hose connector. Such a ring would project to some extent from the connector body and this would therefore interfere with the expansion of the hose over the connector body. Further, the hose connector is likely to be made up numerous times. The cut end of the hose is not chamfered so that it would present an abrupt edge to a sealing ring. A deformable sealing ring could easily become damaged or dislodged by repeated insertion and removal of a hose with an abrupt edge.

The two sets of teeth are preferably on opposite axial sides of the sealing ring so as to concentrate the compressive force from the locking cap in the area around the sealing ring.

As set out above, the locking cap contributes to the low insertion force of the pipe into the connector as it allows the collet to be spaced from the pipe on insertion. However, the sealing ring will still contact the pipe on insertion and provide some increase in the insertion force. Preferably, therefore, the sealing ring is retained in a groove in the body such that in the unlocked configuration, less than 5% of the diameter of the ring projects beyond the groove. This reduces the extent to which the sealing ring resists the insertion of the pipe.

Preferably, the outer diameter of the body either side of the groove increases in an axial direction away from the groove. This allows the pipe to be bowed inwardly in the vicinity of the sealing ring thereby providing greater compression of the sealing ring. This is particularly useful when the sealing ring is set relatively deep in the groove as set out above.

A plumbing system with the connectors in place is subjected to a pressure test to check the integrity of the connections. If the connector has not been locked it is desirable that it will reliably fail this pressure test. If it does not fail and the connector has not been locked it may then fail at a future point in time which can cause a serious leak. Preferably, therefore, the sealing ring is retained in a groove in the body and the groove is provided with a projecting or recessed feature which provides an enhanced leakage path around the seal in the unlocked configuration. This creates a more reliable leakage path in the unlocked configuration ensuring that an unlocked connection is more likely to fail the pressure test.

This forms a third aspect of the disclosure which is a pipe connector comprising:

- a hollow body having a central throughway defining an axis, the body comprising a tubular part at at least one end, the tubular part having an outer face to seal, in use, with an inner diameter of a pipe placed over the tubular part:
- a collet fitted over the tubular part of the body so as to be axially fixed with respect to the body and being spaced from the tubular part to form a cavity for the pipe, the inner face of the collet having at least one tooth to grip the pipe, in use, and the outer face of the collet having a first screw thread; and a locking cap fitted over the collet and having an inner face with a second screw thread which is complementary to the first screw thread, wherein screwing the locking cap onto the collet from an unlocked configuration to a locked configuration causes inward deflection of the collet to press, in use, the collet onto the pipe and the pipe onto the tubular part to seal the interface between the body and the pipe;

wherein in the unlocked configuration, the inner diameter of a first constriction at an open end of the collet is greater than the inner diameter of the distal part of the collet that receives the pipe.

This may be used in conjunction with any of the optional features of the first aspect of the disclosure.

The locking cap is preferably captive on the collet, such that the connector can be supplied and used as a single assembly. The locking cap and body preferably have an end stop to prevent them from being unscrewed beyond the unlocked configuration. The locking cap can then be screwed to this end stop during the assembly process and the connector is supplied to the end user in a condition in which it is ready to use The movement of the locking cap onto the collet means that there is a clear visual difference between the locked and unlocked configurations. Preferably the distal end of the collet protrudes from the locking cap and is visible to the user in the unlocked configuration and is covered by the locking cap or protrudes to a lesser extent in the locked configuration. This provides an enhanced visual difference in the two configurations.

To provide a further visual indication of the locked configuration, the proximal end of the collet is preferably visible at the proximal end of the connector in the locked configuration, in use, with the pipe in place.

To enhance these visual differences, the collet and locking cap are preferably different colours.

The collet preferably has at least one through slot at its distal end which is exposed in the locked and unlocked configurations allowing the end of the pipe to be visible, in use, through the slot when the connector is in the locked and unlocked configurations with the pipe inserted. This allows the user to verify that the end of the pipe itself has been fully inserted into the connector in both of the locked and unlocked configurations.

This forms a fourth aspect of the disclosure which is pipe connector comprising:

a hollow body having a central throughway defining an axis, the body comprising a tubular part at at least one end, the tubular part having an outer face to seal, in use, with an inner diameter of a pipe placed over the tubular part:

a collet fitted over the tubular part of the body so as to be axially fixed with respect to the body and being spaced from the tubular part to form a cavity for the pipe, the inner face of the collet having at least one tooth to grip the pipe, in use, and the outer face of the collet having a first screw thread; and a locking cap having an inner face with a second screw thread which is complementary to the to the first screw thread, wherein screwing the locking cap onto the collet from an unlocked configuration to a locked configuration causes inward deflection of the collet to press, in use, the collet onto the pipe and the pipe onto the tubular part to seal the interface between the body and the pipe:

wherein the distal end of the collet protrudes from the locking cap and is visible to the user in the unlocked configuration and is covered by the locking cap or protrudes to a lesser extent in the locked configuration; and wherein the collet and locking cap are different colours.

This may be used in conjunction with any of the optional features of the previous aspects of the disclosure.

Furthermore, the disclosure may include a fourth aspect which is a pipe connector comprising:

a hollow body having a central throughway defining an axis, the body comprising a tubular part at at least one end, the tubular part having an outer face to seal, in use, with an inner diameter of a pipe placed over the tubular part:

a collet fitted over the tubular part of the body so as to be axially fixed with respect to the body and being spaced from the tubular part to form a cavity for the pipe, the inner face of the collet having at least one tooth to grip the pipe, in use, and the outer face of the collet having a first screw thread; and a locking cap having an inner face with a second screw thread which is complementary to the to the first screw thread, wherein screwing the locking cap onto the collet from an unlocked configuration to a locked configuration causes inward deflection of the collet to press, in use, the collet onto the pipe and the pipe onto the tubular part to seal the interface between the body and the pipe;

wherein the collet has at least one through slot at its distal end which is exposed in the locked and unlocked configurations allowing the end of the pipe to be visible, in use, through the slot when the connector is in the locked and unlocked configurations with the pipe inserted.

These may be used in conjunction with any of the optional features of the first and/or second aspects of the disclosure.

The collet and locking cap have complementary end stops to prevent overtightening. This stops overstressing of the connector. Further the collet and locking cap preferably have complementary features to produce a sound when the locking cap reaches the locked configuration. This indicates to the user that the connector is fully locked and should therefore give them confidence that the connector has been correctly deployed as well as ensuring that they do not try to overstress the connection.

Preferably, at least one, and more preferably all of the body, collet and locking cap have a tensile modulus of greater than 2000Mpa and a heat distortion temperature of greater than 200°C. Preferably all of the body, collet and locking cap have a tensile modulus of greater than 2000Mpa. In a hose connector the hose grip typically has a tensile modulus of 1200and a heat distortion temperature 75°C. while the inner core typically has a tensile modulus of 2700 and a heat distortion temperature of 104°C.

As an alternative to the above described sealing ring within a groove, tubular parts may alternatively be provided with at least one annular ridge to provide the seal, in use, with the inner diameter of the pipe placed over the tubular part. In this case, the collet presses the pipe on to the at least one annular ridge in order to provide the seal between the pipe and the tubular part.

A sixth aspect of the disclosure relates to a pipe connector comprising:

a hollow body having a central throughway defining an axis, the body comprising a tubular part at at least one end, the tubular part having an outer face to seal, in use, with an inner diameter of a pipe placed over the tubular part:

a collet fitted over the tubular part of the body so as to be axially fixed with respect to the body and being spaced from the tubular part to form a cavity for the pipe, the inner face of the collet having at least one tooth to grip the pipe, in use, and the outer face of the collet having a first screw thread; and a locking cap having an inner face with a second screw thread which is complementary to the to the first screw thread, wherein screwing the locking cap onto the collet from an unlocked configuration to a locked configuration causes inward deflection of the collet to press, in use, the collet onto the pipe and the pipe onto the tubular part to seal the interface between the body and the pipe;

wherein the collet and locking cap have complementary features to produce a sound when the locking cap reaches the locked configuration.

This may be used in conjunction with any of the optional features of the previous aspects of the disclosure.

Optionally the complementary features include a break off tab configured to be broken off as the locking cap reaches the locked configuration. A tab which breaks off, as opposed to one which abruptly hits against an opposing surface has been found to produce a louder naise. Optionally, the collet and locking cap are configured to retain the broken off tab in the connector. This avoids loose pieces of plastic in the vicinity of the connector joint which might become caught up in other components and provide unwanted waste and/or a hazard which might interfere with other connectors.

The disclosure also extends to a method of connecting to a commercial plumbing pipe comprising attaching a connector according to any of the above aspects to the pipe. One or more of the hollow body, collet and locking cap may be made of plastic.

Although the connector may be suitable for other uses, the pipe connector has been designed to be suitable for a commercial plumbing pipe.

Collets are often manufactured by moulding a main collet body and inserting metal elements in order to provide the teeth. This is because moulding a collet with an integral tooth is difficult to achieve in practice, firstly because it is difficult to create a mould cavity with a sufficiently well-defined recess that produces a sharp enough tooth, and secondly because the relatively complex internal geometry of the collet makes the withdrawal of the mould core difficult.

According to a seventh aspect of the present disclosure, there is provided a method of moulding a collet, the collet having a hollow tubular shape with a central main axis, a first end and a second end, the outer wall extending between the two ends, the outer wall being divided into a plurality of legs extending from the first end by a plurality of slots extending away from the first end;

the inner diameter of an inner face of the outer wall initially increasing from the first end towards the second end creating a ramp surface on the inner face of the outer wall adjacent to the first end;

at least one inwardly facing first tooth on the inner face of at least one leg, the first tooth being axially between the second end and the ramp surface;

the method comprising moulding the collet in a mould comprising a mould body and an axial core which together define a mould cavity in the shape of the collet;

the core comprising two parts which are axially separable from one another, a first part which forms the inner face of the outer wall towards the first end including the ramp surface up to each first tooth and including one side of each first tooth, a second part forming the inner face of the outer wall including the opposite side of each first tooth;

the method further comprising drawing the first part axially from the mould cavity while the second part remains in place, such that the interaction between the first part and the ramp surface causes outward deflection of the legs away from the second part to allow the second part to be subsequently removed axially from the mould cavity.

The method uses a two part core, with the parts forming opposite sides respective first teeth. This ensures that a well-defined sharp tooth can be formed as the peak of the tooth is formed in the gap between the first and second parts. Further, interaction between the ramp surface and the first part when the first part is axially withdrawn from the mould cavity, separates the collet legs away from the second part thereby deflecting the first teeth outwardly to allow the collet to be pushed off of the second part without the teeth interfering with the second part.

Optionally the collet comprises at least one second inwardly facing tooth on the inner face of the outer wall of at least one leg, the second tooth being axially between the first tooth and the second end, the second part of the axial core comprising a respective recess to form each respective second tooth, wherein axial movement of the collet off of the second part causes outward deflection of the collet legs caused by interaction of each second tooth with the second part.

This provides a way of manufacturing a collet with second inwardly facing teeth. The second teeth interact with the second part to cause further outward deflection of the collet legs thereby further facilitating the removal of the collet from the second part. In this case, optionally, the second part is formed of two components which are axially fixed with respect to one another, wherein the at least one recess to form each respective second tooth is formed at the interface between the two components.

As with the first teeth, the two part arrangement of the second part ensures that the second teeth are also sharp.

Optionally, the method further comprises, following withdrawal of the first part axially from the mould cavity to deflect the legs of the collet, moving an ejector plate in the direction opposite to which the direction in the first part is withdrawn from the mould in order to push the collet off of the second part of the mould.

BRIEF DESCRIPTION OF THE DRAWINGS

An example of the pipe connector in accordance with the present disclosure will now be described with reference to the accompanying drawings, in which:

FIG. 10 is a perspective view of the end of the connector body in the same orientation as in FIG. 3.

FIG. 10A shows the detail in the circle A in FIG. 10;

FIG. 10B is a cross-section through plane A-A in FIG. 10 of the part of the connector in the circle A in FIG. 10 showing the body, sealing ring and pipe when the locking cap is in the unlocked configuration;

FIG. 10C is a view similar to FIG. 10B showing the same components when the locking ring is in the locked configuration;

FIG. 11 is a perspective view of the collet in the orientation shown in FIG. 4;

FIG. 11A shows the detail in the circle labelled A in FIG. 11;

FIG. 11B is a partial cross section through the collet and the body in the plane B-B in FIG. 11 and in the circle labelled A in FIG. 11 but also shows the locking cap in this region;

FIG. 23 is a perspective view of the locking cap of the third example;

FIG. 24 is a cross-sectional view through the locking cap of FIG. 23;

FIG. 24A shows the detail in circle A in FIG. 24;

FIG. 25 is a partial cross-section of fourth example of a connector in an unlocked configuration with a pipe inserted;

FIG. 26 is a cross-section in a radial plane E-E of the fourth connector;

FIG. 26A shows the detail in rectangle A in FIG. 26;

FIG. 27 is a view similar to FIG. 26 showing the connector in the locked configuration;

FIG. 28 is a view similar to FIG. 26 showing the connector in the locked configuration;

FIG. 28A shows the detail in rectangle A in FIG. 28;

FIG. 29 is a perspective view of the locking cap of the fourth example;

FIG. 30 is a cross-section in a radial plane through the locking cap of FIG. 29; and FIG. 30A shows the detail in circle A in FIG. 30.

DETAILED DESCRIPTION

The plumbing connector described below shows a double-ended axial connector in which both ends are configured according to the present disclosure. The connector may be applied to other shapes such as a right-angled or T connector. Further, the connector may be provided at only one end and the opposite end may have a different type of connection or be integrated into some other component.

The connector is a plumbing connector for use with a plastic pipe P. This may be a single layer plastic pipe, but is more commonly a multi-layered pipe (MLCP). As can best be seen, for example, in FIG. 6A, the multi-layered pipe has a number of layers L, typically inner and outer polymeric layers and an intermediate layer of a metal such as aluminium.

Plumbing connectors must be suitable for being used in both cold and hot water systems as well as in heating systems. As such, they must be able to cope with a continuous temperature of 95° C. and must also be able to cope with temperatures of above 100° C. for short periods.

Figures 3, 4:
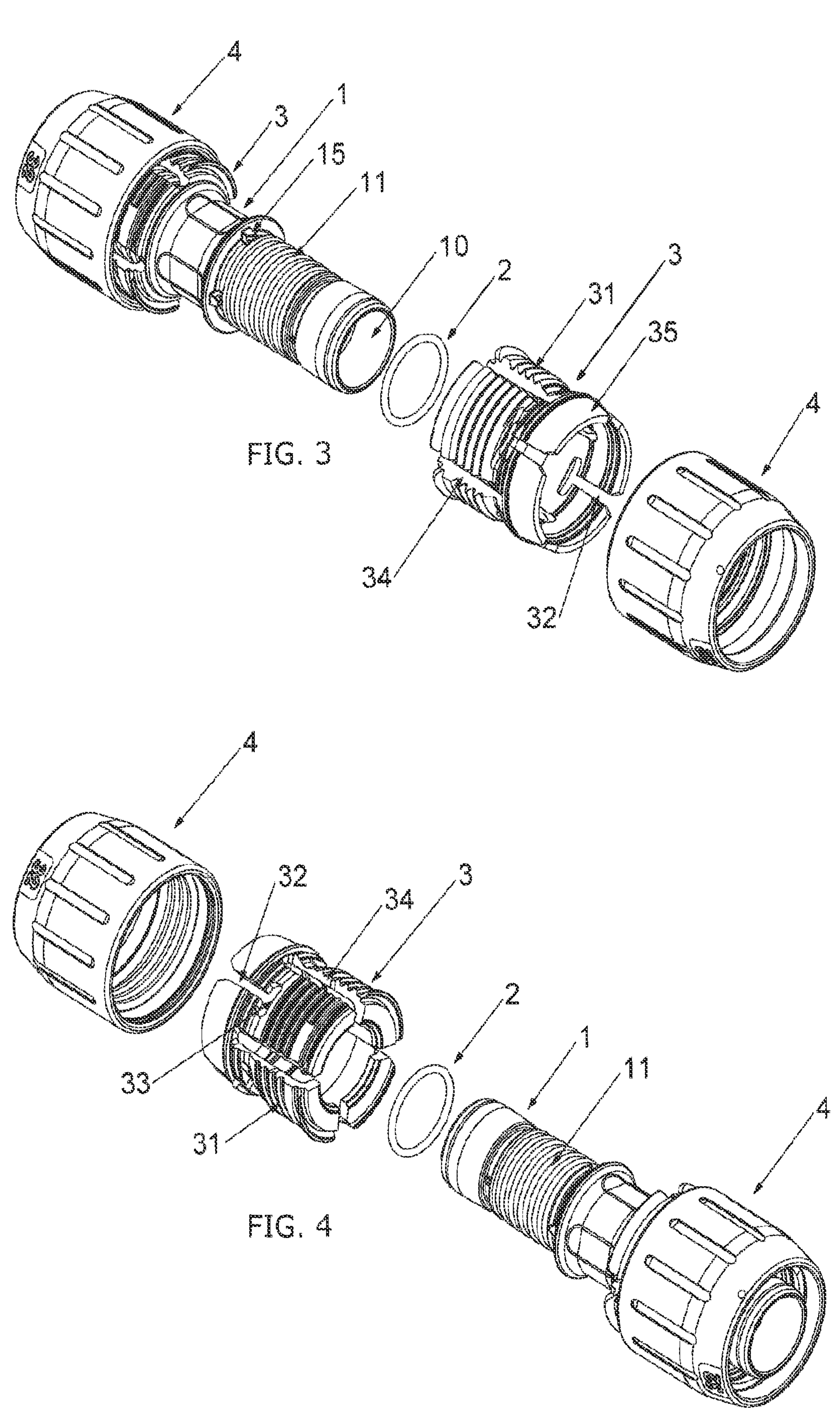
Fig. 3 is a perspective view from one end of the connector with the components of one end disassembled.
Fig. 4 is a view similar to Fig. 3 but with the opposite end disassembled.

The connector is made from just four components, namely a body 1, an O-ring 2, a collet 3 and a locking cap 4 as shown, for example, in FIG. 3. The body 1 is a double-ended body such that it has an O-ring 2, collet 3 and locking cap 4 at either end.

The components are preferably high performance polymers. For example the body 1 may be unfilled PPSU/PSU/PPS/PVDF. The locking cap 4 and collet 3 the may be the same materials but these may be glass filled. Other possibilities for the cap and collet may be GF PA66/PA12/Amodel/Grivory'

Figure 1A:
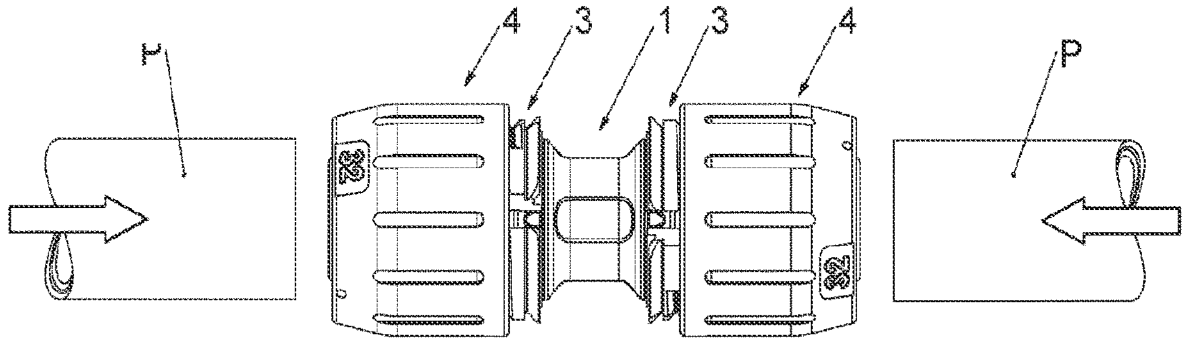
Fig. 1A is a side view of a connector and two pipe ends with the connector in its unlocked configuration and prior to insertion of the pipes.
Figure 1B:
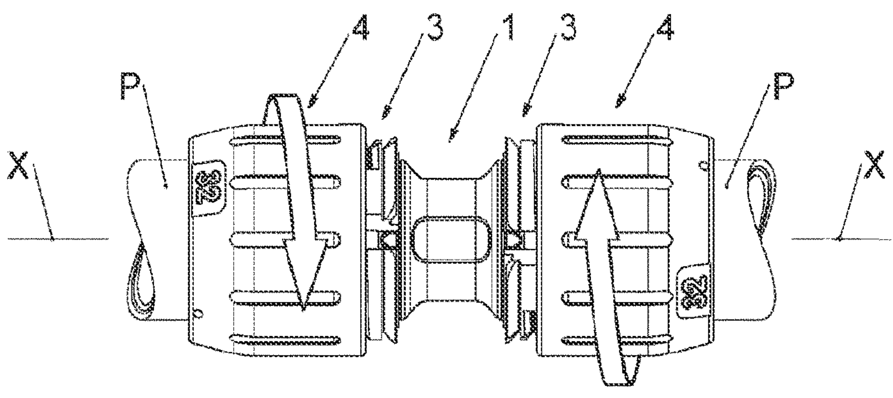
Fig. 1B is a view similar to Fig 1A with the pipes inserted into the connector.

In broad terms, the body 1 has a generally tubular configuration with a throughway 10 extending axially along a main central axis X (FIG. 1B). At the proximal end (i.e. the end closest to the open end of the connector, the distal end being the opposite end furthest from the open end), the body 1 has a tubular portion 11 over which the pipe P is received as shown, for example, in FIG. 6. Partway along the tubular portion 11 is an annular groove 12, which receives the O-ring 2. As shown in various figures, the O-ring 2 seals with the inner diameter of the pipe P as described in greater detail below. Distally of the O-ring 2, the tubular portion 11 is provided with a number crenulations 13. These are provided simply as a way of reducing the mass of material required for the body 1.

The collet 3 has a lip 30 at one end via which it is snap fitted into a groove 14 in the body 1. The outer face of the collet 3 is provided with a screw thread 31. The locking cap 4 has a complementary screw thread 40 such that the locking cap 4 can be rotated with respect to the collect to lock the connector as described in greater detail below. As well as the screw-threaded engagement, the locking cap 4 is also captive on the collet 3 as also described in greater detail below.

Figures 5, 5A:
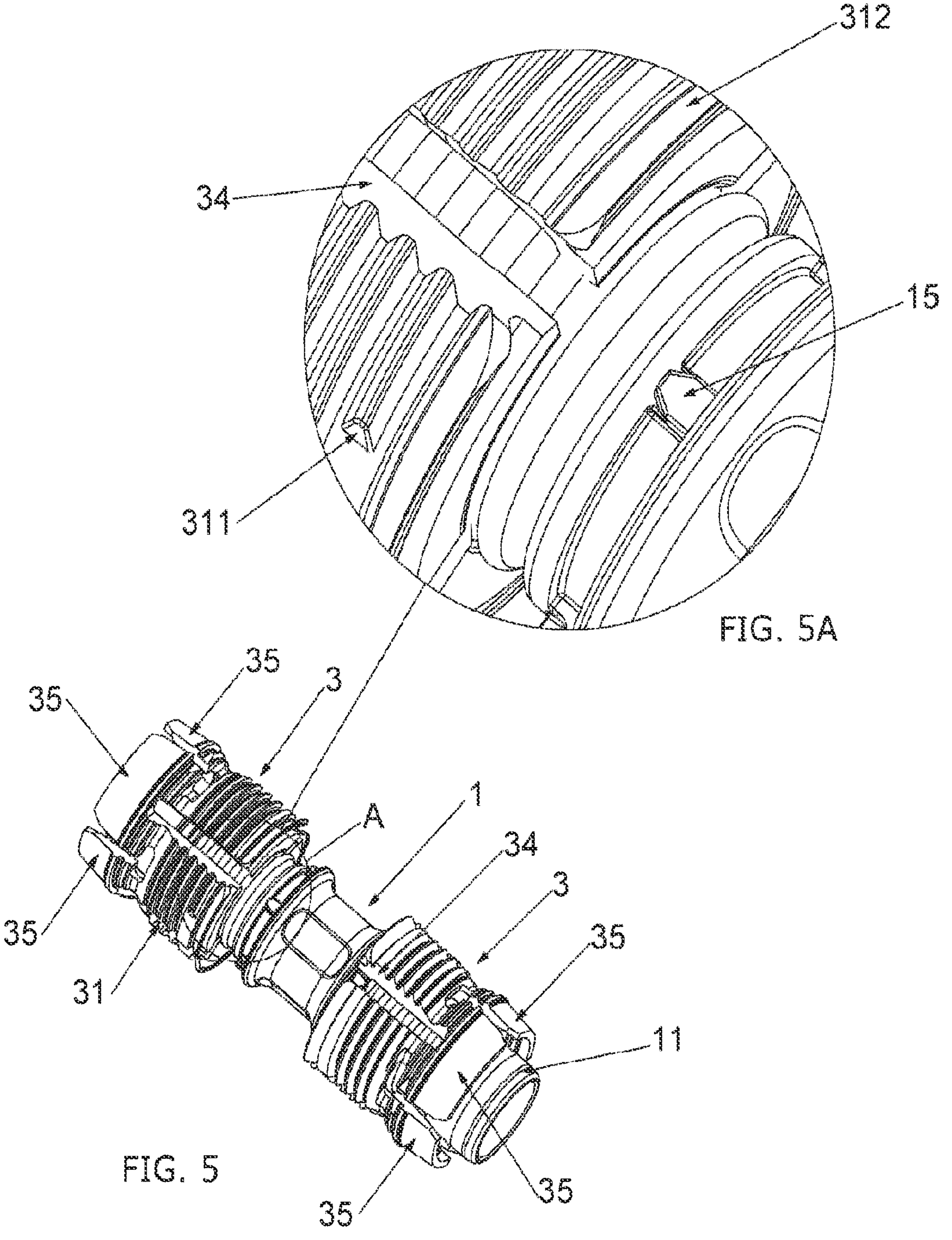
Fig. 5 is a perspective view of the connector without either locking cap and with the collet at the left hand end partially assembled.
FIG. 5A shows the detail within the circle labelled A in FIG. 5.

The collet 3 is provided with a plurality of first axial slots 32 extending from the proximal end. A plurality of second axial slots 34 extend from the opposite end of the collet and these axially overlap with the first axial slots 32 but are circumferentially offset with respect to these slots. The collet 3 is made of a relatively rigid material and the slots provides the necessary flexibility for the collet to be fitted in place. This is done by forcing the collet 3 over the tubular portion 11 (as shown in FIG. 5) until the lip 30 snaps in the groove 14. A number of detents 15 are provided at the distal end of the tubular portion 11, which engage in the ends of the second axial slots 34 to prevent rotation of the collet 3 with respect to the body 1. The collet 3 is thereby axially and radially fixed with respect to the body 1.

Figures 6, 6A:
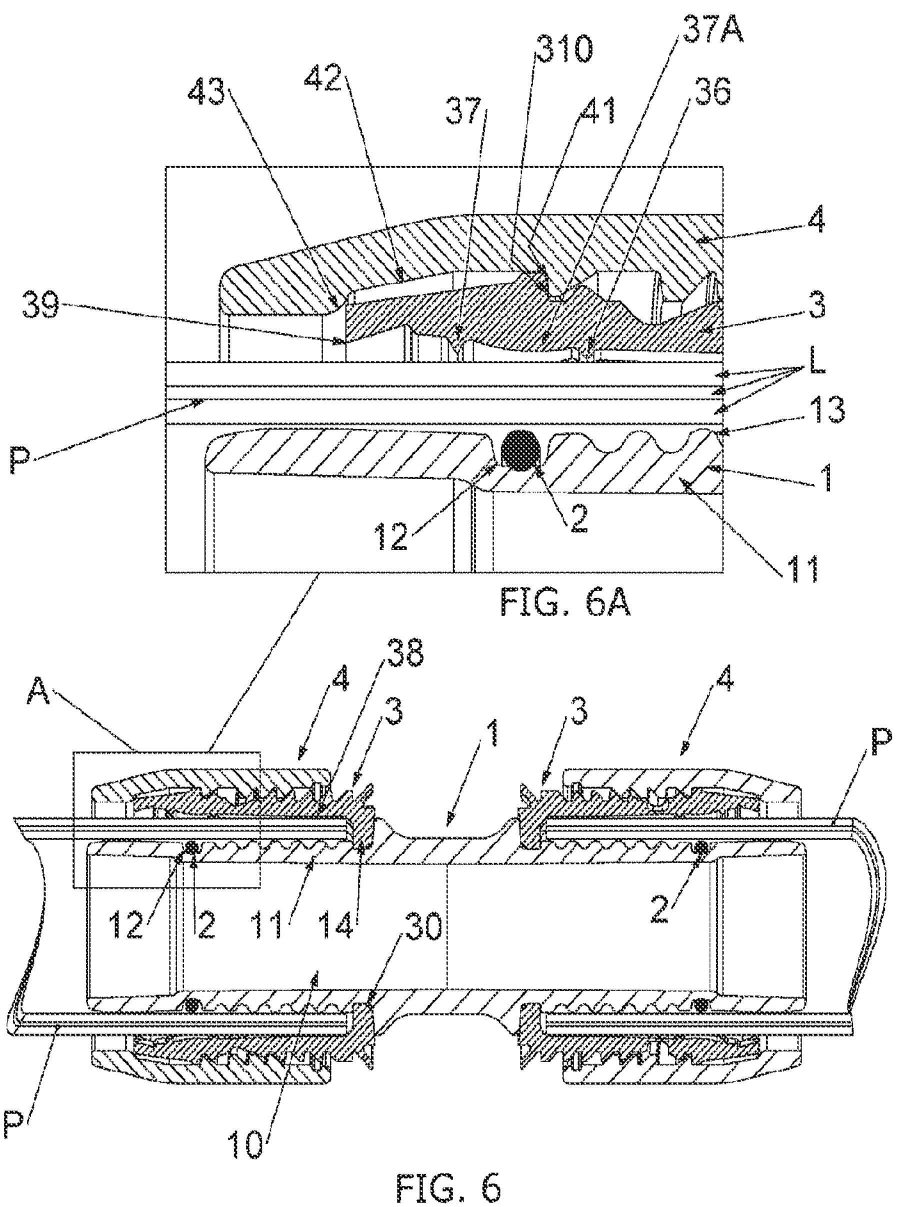
FIG. 6 is an axial cross-section through FIG. 1B showing the connector in its unlocked configuration.
FIG. 6A shows the detail in the box labelled A in FIG. 6.

With the collet 3 fixed in place, the locking cap 4 is then pressed on to the collet 3. The first axial slots 32 allow the distal end of the collet to compress and allow the locking cap 4 to be pressed onto the collet at least until some of the part of the screw thread 31 engages with part of the screw thread 40. The collet may be pushed to a desired location at which the two screw threads 31, 40 begin to engage. However, for a more reliable engagement, the locking cap 4 is pressed onto the collet beyond the unlocked position and the locking cap 4 is then screwed back to the unlocked position shown in FIG. 1A. When the locking cap 4 is in the unlocked position, an inwardly extending annular shoulder 41 engages with a complementary outwardly extending shoulder 310 on the collet as best shown in FIG. 6A. This provides a stop to ensure that the locking cap 4 cannot be unscrewed beyond this unlocked position, thereby holding the locking cap 4 captive on the collet 3.

The first axial slots 32 also serve to separate the distal end of the collet 3 into four separate legs 35. There could be a different number of first axial slots 32 and therefore a corresponding different number of legs 35. Each leg 35 has an inner tooth 36 and an outer tooth 37 closer to the proximal end of the collet than the inner tooth 36. Distally of the inner tooth 36 is a pipe receiving portion 38 with an inner diameter, which corresponds to the outer diameter of the pipe P. The collet has an inward bulge 37A between the two sets of teeth. In the unlocked configuration shown, for example, in FIG. 6A, at the distal face of the connector, the inner diameter is significantly larger than the outer diameter of the pipe P. This can be seen in FIG. 6A where the innermost edge 39 of the proximal end of the collet is spaced from the pipe P.

The connector is supplied in this unlocked configuration to an end user. This configuration of connector is depicted in FIGS. 1A, 2A, 3, 6, 6A and 9A.

Figure 1C:
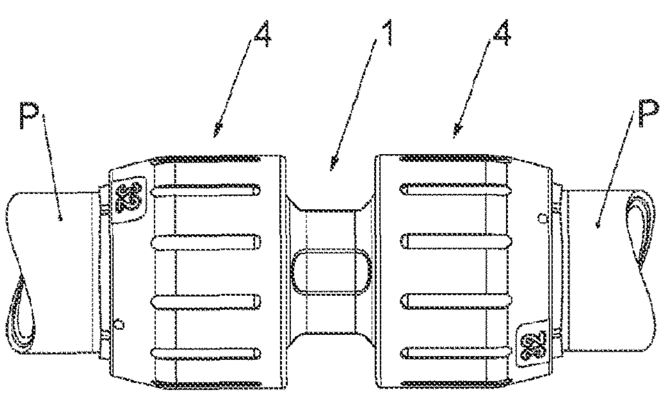
Fig. 1C is a view similar to Figs. 1A and 1B in the locked configuration.
Figures 2A, 2B, 2C:
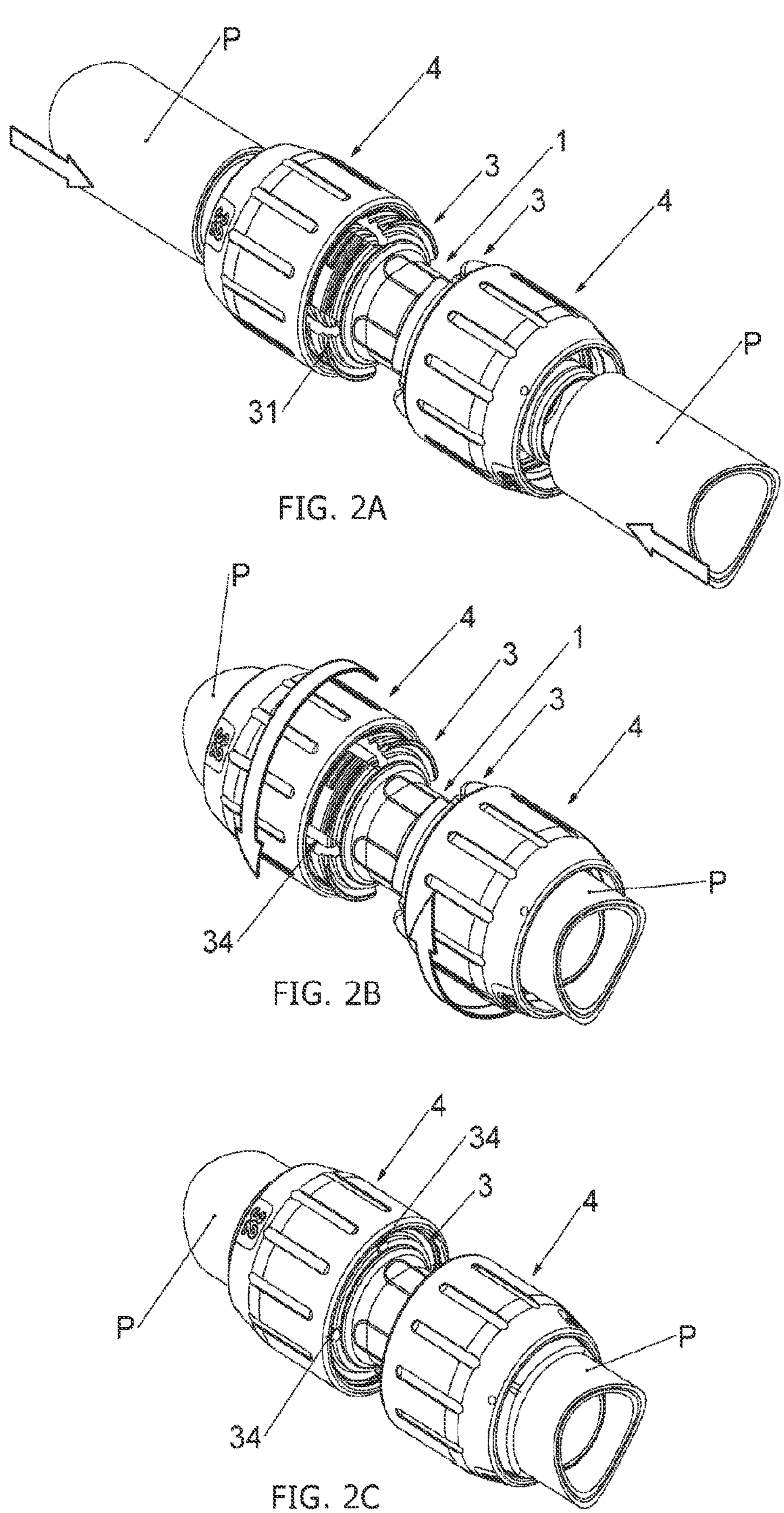
Figs 2A-C are perspective views showing states corresponding to irrespectively Figs 1A-C.

As will be appreciated from, for example, FIG. 1A, the collet 3 projects to a reasonably significant extent from the distal end of the cap 4. By comparing FIG. 1A with FIG. 1C, it can be seen that there is a significant visual difference between the connector in the unlocked and locked configurations. Also, the proximal end of the collet is substantially flush with the proximal end of the body in the locked configuration so the user has a visual indication that the collet is in the correct position This visual significance can be enhanced if the collet 3 and locking cap 4 are made from materials of contrasting colours. This makes it easy to inspect the connections from a distance and to determine whether any have yet to be locked and also to confirm that they have been locked.

In this unlocked configuration, the pipes P can be inserted into the connector. They are fully inserted to the position shown in FIG. 6 and FIG. 8 where the pipe P abuts against the lip 30 in the collet 3.

The connector is specifically designed to provide a low insertion force for the pipe P. A number of features of the design allow for this. As set out above, the inner diameter of the collet 3 at the proximal end is significantly larger than the pipe P as can be seen in FIG. 6A. This allows the pipe to be inserted with little or no interaction with the collet. As can be seen in FIG. 6A, the outer tooth 37 is spaced from the pipe P. The inner tooth 36 can be similarly spaced, but is shown in FIG. 6A with a very minimal interaction with the pipe P which may cause a very small outward deflection of the collet providing a negligible increase in insertion force. The tubular portion 11 of the body 1 is designed to have a reasonably close tolerance with the inner diameter of the pipe P which again may give rise to a minimal insertion force. As can be seen in FIG. 6A, the O-ring seal 2 will engage with the pipe P on insertion. However, the annular groove 12 is designed to be deeper than usual such that insertion of the pipe causes a relatively small compression of the O-ring 2 upon insertion.

As will be appreciated for example, from FIGS. 6 and 6A, the pipe P is being inserted into a channel which is relatively wide at the opening and gently tapers towards the distal end. As such, the pipe P does not require a lead-in chamfer on either leading edge in order to be inserted in the connector. Further, if there are any burrs on the leading edge of the pipe, these again should not interfere unduly with the connection process as the pipe P can still be inserted into the proximal end of the collect and any burrs which encounter the gently tapering surface of the collet 3 will be compressed down onto the pipe as it is inserted.

With the pipes fully in place, it is simply a matter of rotating the locking cap 4 in the direction of the arrow shown in FIG. 1B along the complementary screw threads 31, 40 until the locking caps 4 reach the locked position as shown in FIGS. 1C, 2C, 7, 7A, 8, 8A and 9B.

One of the effects of this has already been described in that the locking cap 4 now covers up the collet 3 to provide a visual indication of the locked position. Within the connector, the effect of screwing the locking cap 4 to the locked position is to compress the collet 3, which can best be seen in a comparison of FIGS. 6 and 6A with FIGS. 7 and 7A.

Figures 7, 7A:
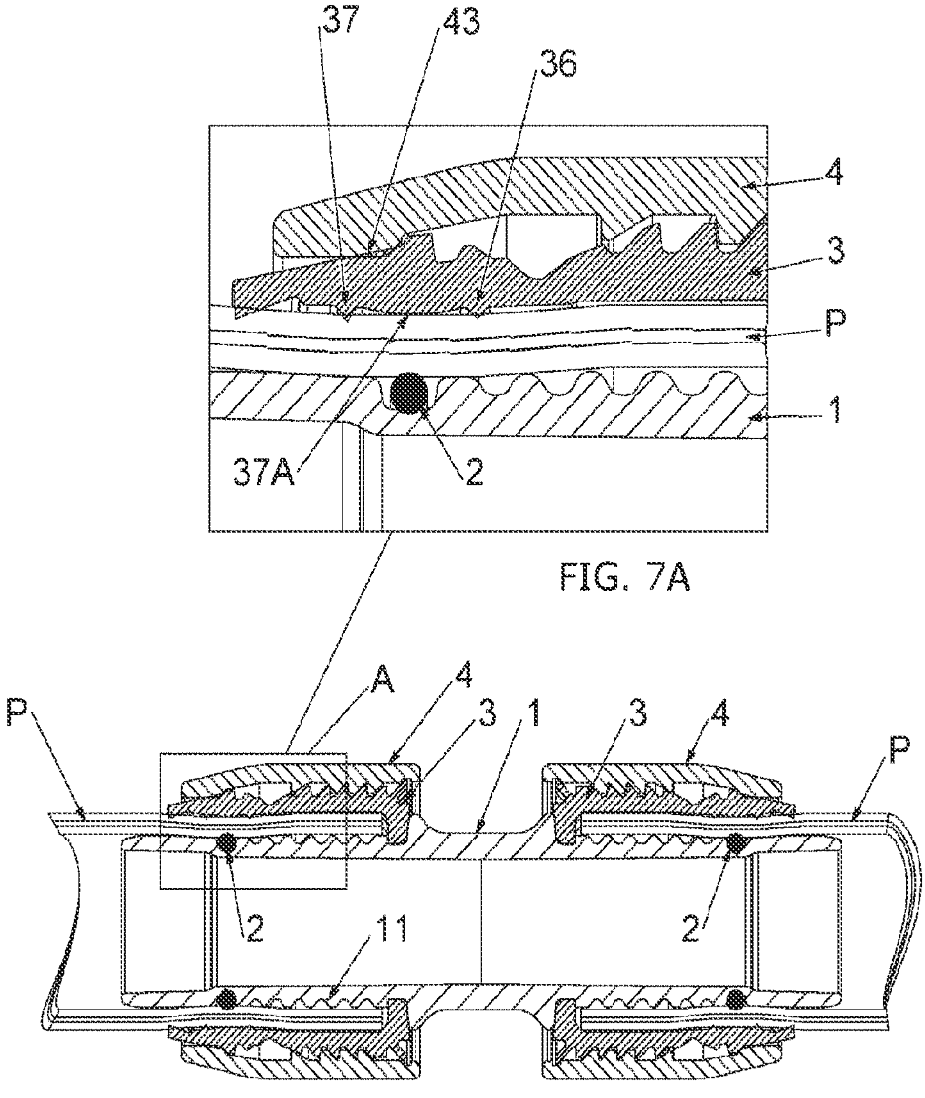
FIG. 7 is an axial cross-section through the connector in the locked configuration shown in FIG. 1C.
FIG. 7A shows the detail in the box labelled A in FIG. 7.

In the unlocked configuration in FIG. 6A, the proximal end of the collet 3 is within an annular recess 42 within the body 4. This annular recess 42 terminates at a curved shoulder 43, which abuts against the outermost edge of the proximal end of the collet 3. As the locking cap 4 is screwed towards the locked position, the shoulder 43 immediately runs over the outer face of the proximal portion of the collet 3 thereby compressing the legs 35 of the collet 3 onto the pipe P. This inward deflection of the collet legs 35 causes the teeth 36, 37 to bite into the outer face of the pipe P. The inward deflection also causes the pipe P to be bowed inwardly as best shown in FIG. 7A.

Figure 9A:
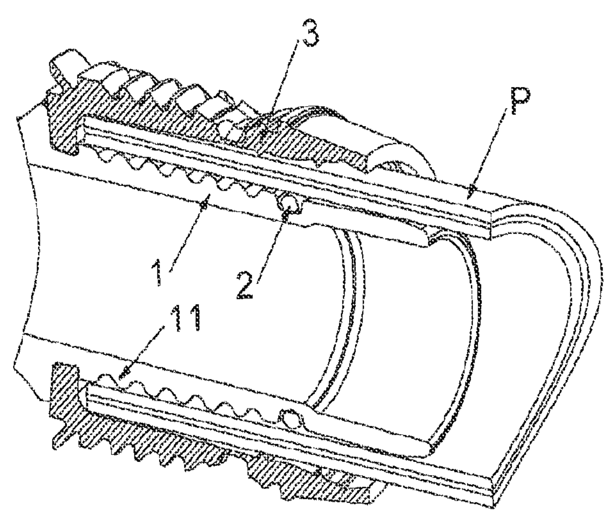
FIG. 9A is a partial cross sectional perspective view without the locking cap showing the component in the unlocked configuration.
Figure 9B:
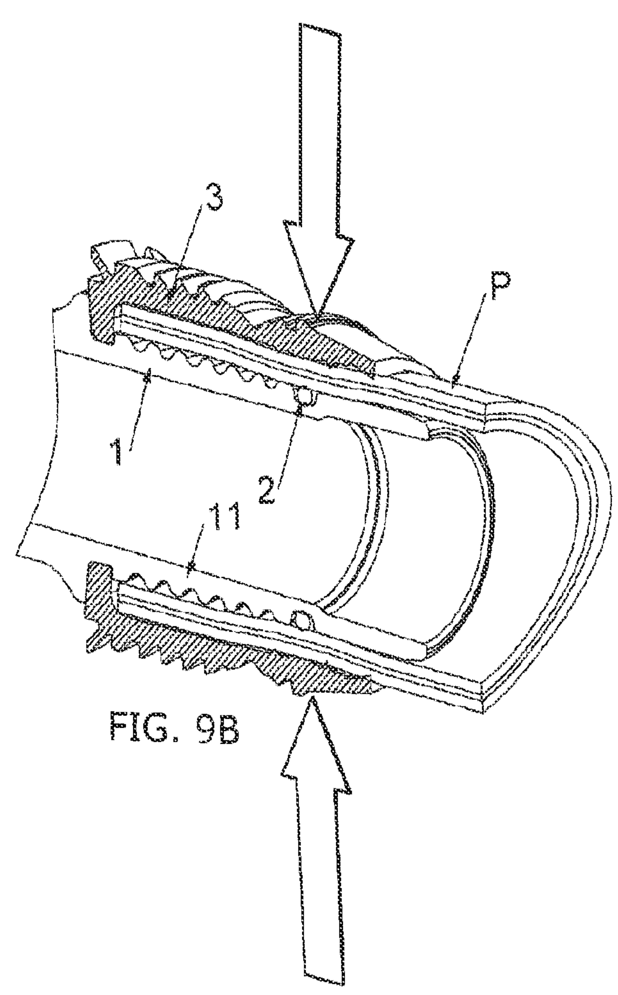
FIG. 9B is a view similar to FIG. 9A showing the same components in the locked configuration.
Figures 12, 12A:
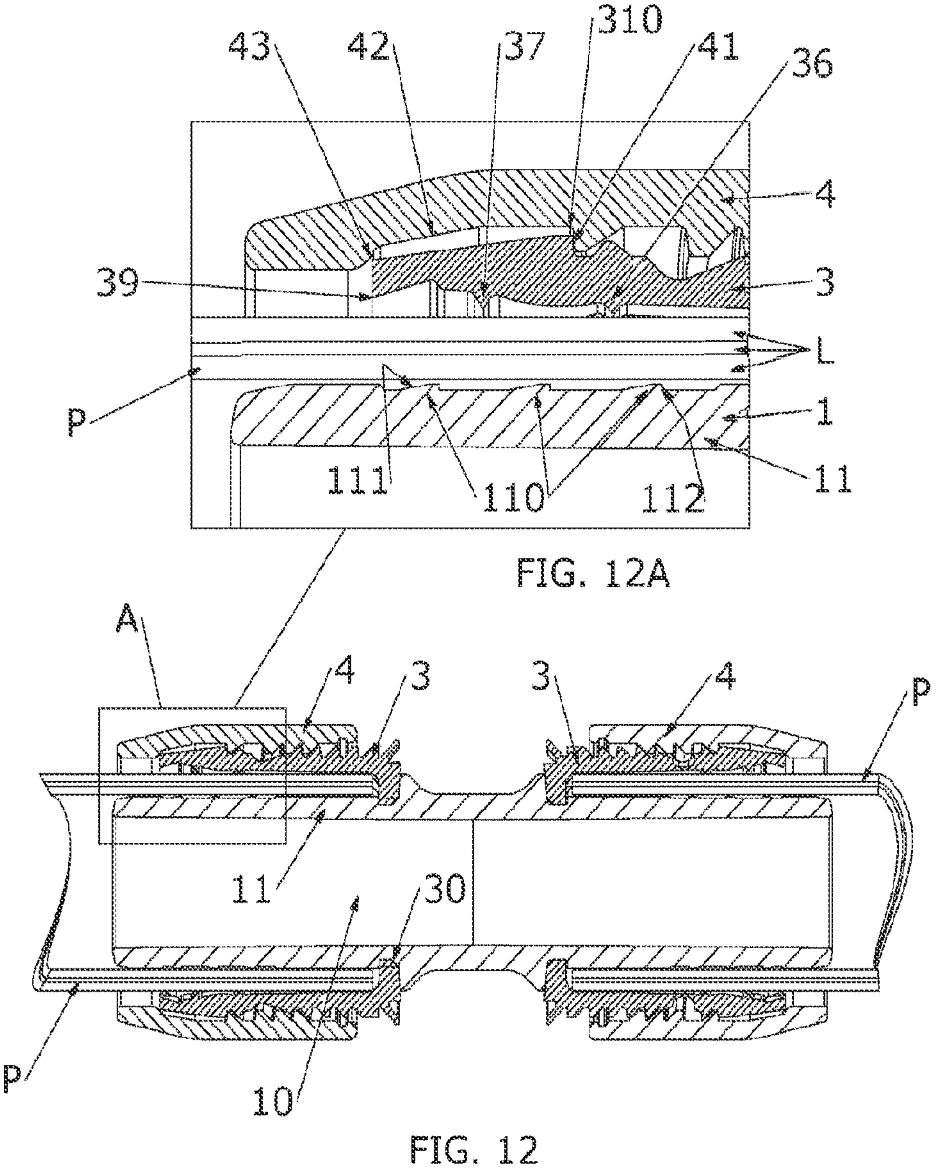
FIGS. 12 and 12A are views similar to FIGS. 6 and 6A showing a second example of a connector.

As can best be seen in FIG. 6A, in the vicinity of the groove 12 for the O-ring, the outer diameter of the tubular part 11 is smaller than the outer diameter of other parts of the tubular part 11. This allows greater deflection of the pipe P to occur in the vicinity of the O-ring 2 as shown in FIG. 7A. As can further be seen from this figure, the teeth 36, 37 are positioned on either side of the O-ring to further enhance this effect and to further press the pipe in place in the vicinity of the seal 2. In the locked configuration, the shoulder 43 ends up in a radial plane which is in close proximity to the radial plane of the O-ring seal 2 and the bulge 37A such that, again, this enhances the compression of the pipe P in the vicinity of the seal 2. This effect is shown in FIG. 9B where the arrow denotes the regions of maximum compression on the pipe P.

This enhanced deflection of the pipe P in the vicinity of the O-ring seal 2 provides very secure gripping of the pipe as well as providing enhanced compression of the O-ring seal 2, which, as set out above, is set relatively deeply within the recess 12.

The collet 3 and locking cap 4 are provided with a feature to prevent over-tightening as shown in FIGS. 11, 11A and 11B. The screw thread 31 on the collet 3 is provided with an end stop 311. The screw thread 40 on the end cap 4 is provided with complementary end stop 44, which abuts against the end stop 31 to prevent further screwing of the end cap 4 onto the collet 3. As shown in FIG. 11B the end stops 311 and 44 have face-to-face contact to provide an abrupt stop. One or both of these could have a ramped surface to provide a let abrupt end stop.

As well as having these end stops, the collet 3 and locking cap 4 also have features to provide an audible click when the locking cap 4 reaches the locked position. This is in the form of an angled lip 312 best shown in FIG. 8A which projects outwardly and distally from the outer face of the distal end of the collet 3. There are effectively four such lips 312, one for each of the legs 35. These engage with a complementary lip 45 on the distal end of the cap 4. As the locking cap 4 approaches the fully locked position, the lip 45 will ride over and compress the angled lips 32 whereupon, as the locking cap 4 reaches the fully locked position, the angled lips 312 will snap into position behind the lips 45. The lips 312 help retain the locking cap 4 on the collet 3 as they can be resiliently biased onto the lip 45 to hold the two components in place. This biasing can also help keep the components together when subject to small movements in use caused by thermal effects, or changes in flow of liquid through the pipes, which might otherwise serve to work the connection loose over time.

Thus, when the user tightens the joint, they can reliably make up the connector and are prevented from overtightening and stressing the components by the complementary stop 311, 44, as well as being provided with an audible indication of when they have reached the correct position by the above-mentioned feature. This gives them confidence that the connector has been correctly locked as well as wasting further effort and potentially stressing the connector by attempting to overtighten it.

Figures 8, 8A:
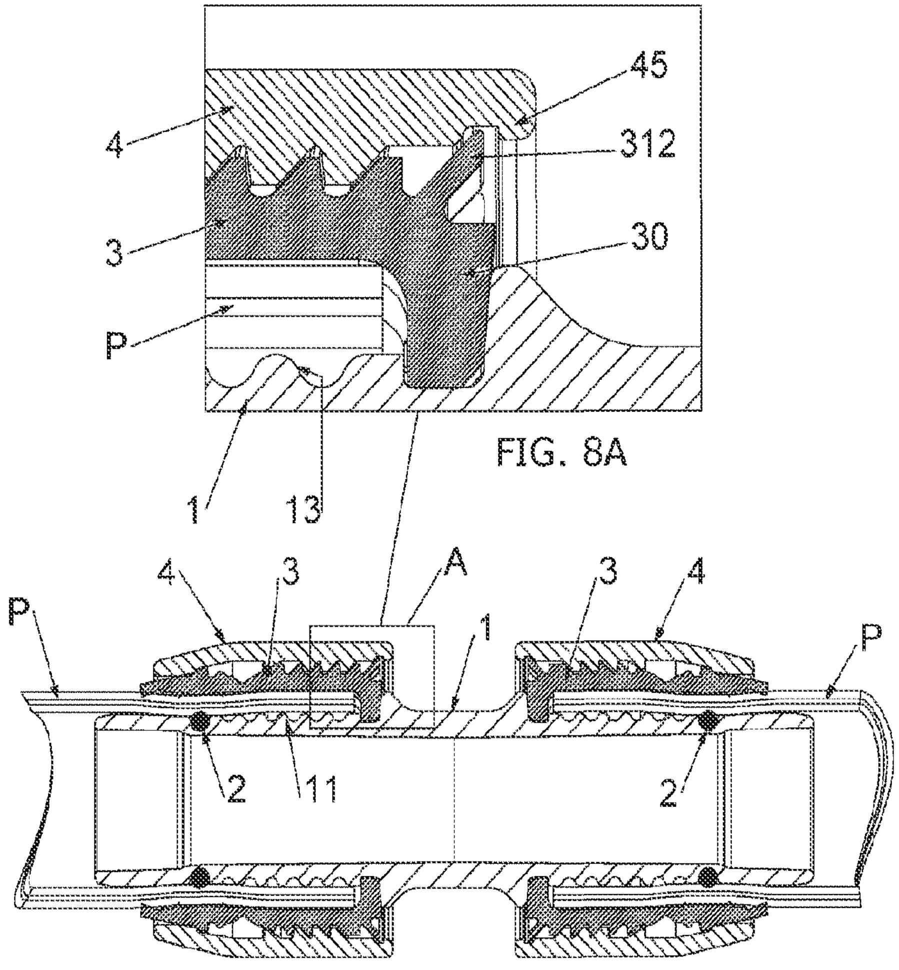
FIG. 8 is an axial cross-section through the connector in the locked configuration shown in FIG. 1C.
FIG. 8A shows the detail in the box labelled A in FIG. 8.

The collet 3 and locking cap 4 have a further feature which improves security of the connector. As can be seen in FIG. 8A, the annular lip 30 at the distal end of the collet 3 is exposed, in use, at the distal end of the end cap 4 when in the locked configuration. FIG. 8A is a cross-section through a plane of the collet 3, which is circumferentially offset from the second annular slots 34. However, in the vicinity of these slots the cross section would effectively be the same as in FIG. 8A same except that the collet 3 would not be visible in this plane. In practice, this means that the end of the pipe itself is visible through the slots 34 (best appreciated from FIG. 2C) at the distal end of the collet 3. Thus, unlike the prior art where it is possible only to determine that the pipe may be close to the correct position, or that a secondary component in the form of a coloured ring is in the correct position, the above arrangement allows a user to determine that, in the locked position, the pipe itself is fully inserted within the connector.

Once a plumbing system is connected up and all of the connectors are locked, the system undergoes a pressure test. This provides a further way of verifying that the joints have been correctly made up. The body 1 is provided with a further feature which assist in this process. This is shown in FIGS. 10 and 10A-C. The annular groove 12 in the tubular part 11 of the body 1 is provided with a bump 16, which projects upwardly from the bottom of the annular groove 12. The effect of this bump is shown in FIGS. 10B and 10C. In the unlocked configuration shown in FIG. 10B, a gap 17 feature is formed on the radially innermost side of the O-ring 2. This corresponds to the configuration shown in FIG. 6A (although the gap and bump are not depicted in this figure). The leakage path for the liquid is from the throughway 10 and into the gap between the tubular body 11 and pipe P to the left of the O-ring in FIG. 6A. Without the bump 16, this liquid pressure should, in most circumstances, be sufficient to pass the O-ring seal 2, which, at this stage, has barely been compressed at all. However, the presence of the bump 16 provides an enhanced and much more reliably defined leakage path behind the O-ring seal 2 and through the gap 17. This ensures that the connector is much more likely to fail the pressure test if the connector has not been locked.

A second example of a connector is shown in FIGS. 12-15. These views correspond to FIGS. 6-9 in relation to the first example. Many of the features of the second example are the same as those of the first example and have been designated with the same reference numerals.

The difference between the two examples relates to the external profile of the tubular portion 11 and the fact that the O ring is now absent.

Figures 13, 13A:
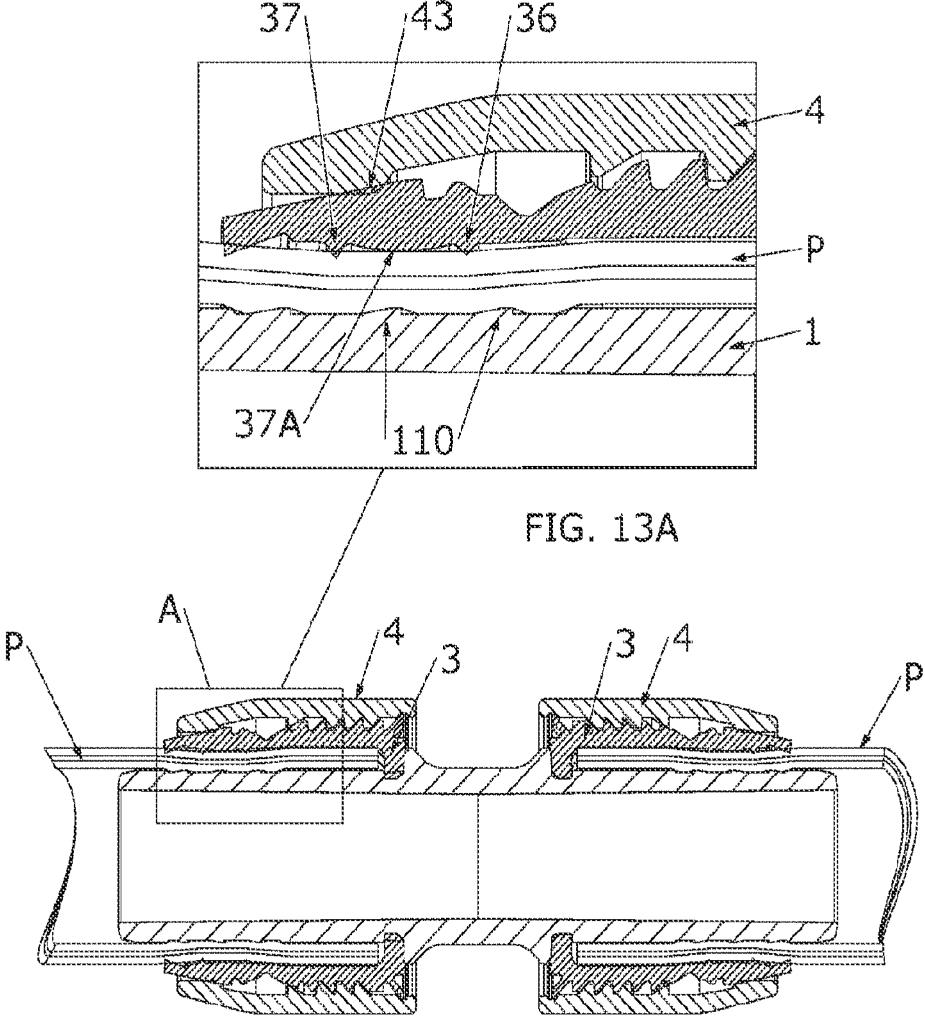
FIGS. 13 and 13A are views similar to FIGS. 7 and 7A showing the second connector.
Figures 14, 14A:
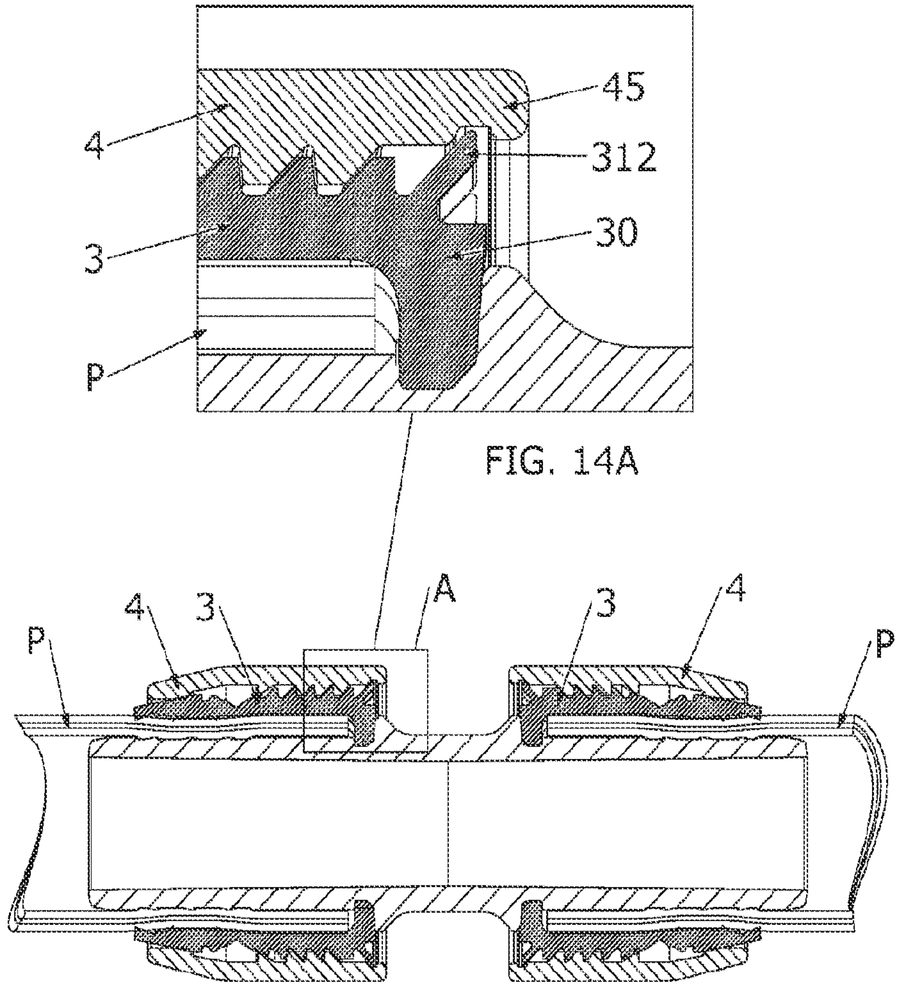
FIGS. 14 and 14A are views similar to FIGS. 8 and 8A showing the second connector.
Figure 15A:
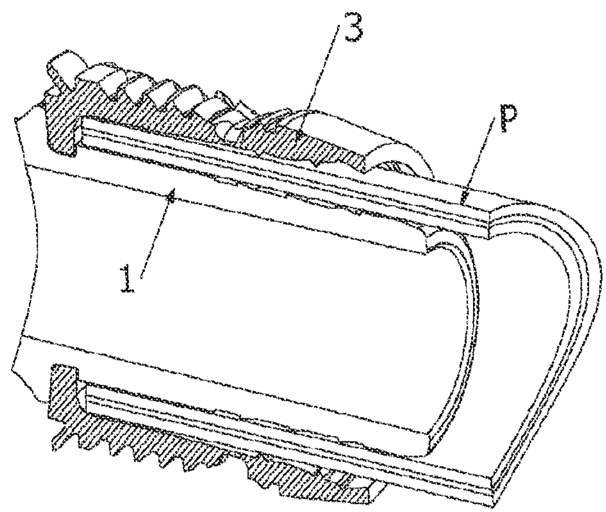
FIGS. 15A and 15B are views similar to FIGS. 9A and 9B showing the second connector.
Figure 15B:
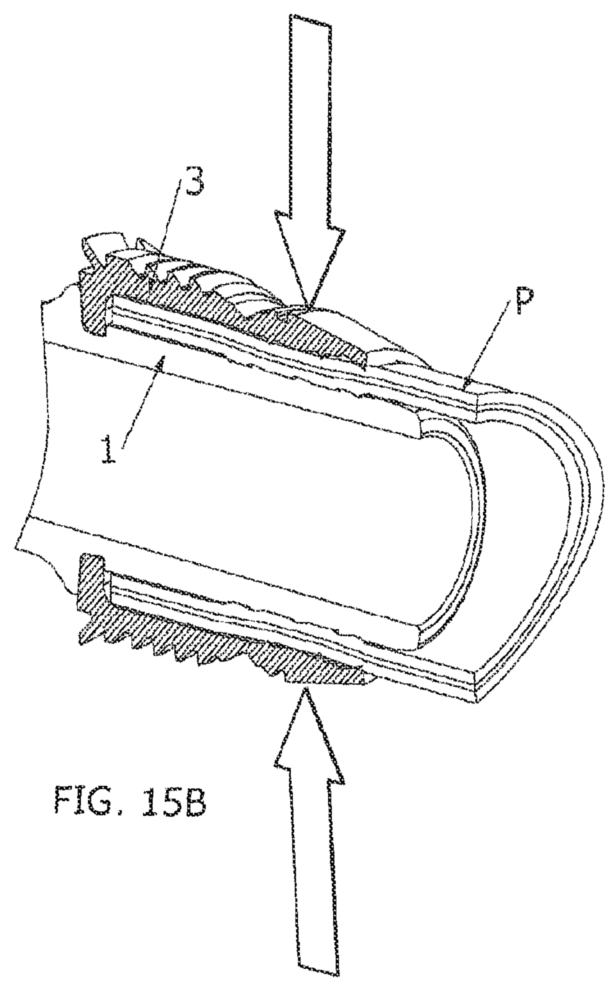

Instead, the outer face of the tubular portion is provided with a number of axially-spaced annular barbs 110. As shown, for example, in FIG. 12A, these barbs have a gently tapering face 111 at the proximal end and an abrupt end face 112 at the distal end which is approximately in a radial plane. These provide a tooth-like structure which digs into and grips the pipe P as shown in FIG. 13A when the locking cap 4 is screwed into place compressing the collet 3. The barbs 110 therefore fulfil the same function as the O-ring 2 in the first example. The first example is provided with a number of crenulations 13 at the distal end of the tubular portion 11. No such portions are shown in relation to the second example, but could be present if desired.

Three barbs 110 are shown in the drawings. This is a reasonable number to provide adequate grip and sealing in the available space. However, a bigger or smaller number of barbs can be used. The barbs 110 may also be used in combination with the O ring seal of the previous example.

The mould for making the collet of the first and second examples will now be described with reference to FIGS. 16 to 19.

Figure 16:
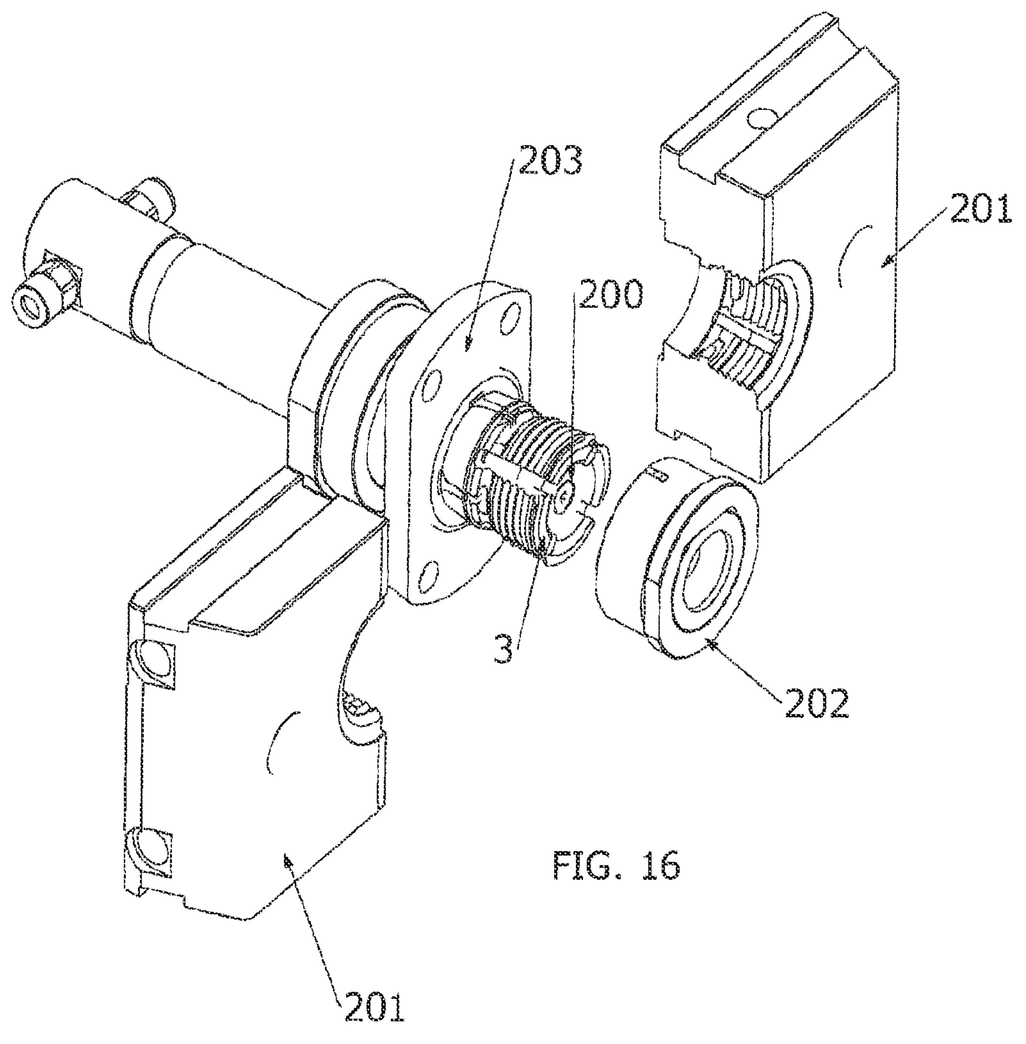
FIG. 16 is a perspective view of the mould tooling with the mould body parts and the retracted configuration, a collet according to the first and second example is shown in situ on the axial core.

FIG. 16 is a perspective view of the mould components shown in a separated form after the formation of the collet 3. The mould comprises an axial core 200, which forms the internal features of the collet as described below and a mould body which forms the outer features of the collet 3. The mould body comprises two mould halves 201 which are moved radially away from the collet as shown (in exaggerated form) in FIG. 16. The mould body also comprises manifold 202, which forms the end of the collet and is also provided with manifolds (not shown) through which the plastic is injected. The mould halves 201 and the manifold 202 are conventional and will not be described in further detail here. The mould also comprises an ejector plate 203 as described in greater detail below.

The manner in which this mould operates will now be described with reference to FIGS. 17 to 19. The mould halves 201 and manifold 202 form the outer profile of the collet 3, but as this is done in a conventional manner, these are not shown in those drawings.

The axial core 200 has an inner sleeve 204, which is hollow to allow cooling water to circulate. The first core mould part 205 is axially slidable on the inner sleeve 204 from a forward position in which it abuts second core mould part 206 to a rearward position as described below. This movement is driven by axial movement of an outer ring 207 engaging with a flange 208 on the first core mould part 205.

The second core mould part 206 is axially fixed to the inner sleeve 204 by a bolt 209 and is provided in two parts, namely an end part 210 and intermediate part 211, which is held in place by being sandwiched between the end part 210 and a shoulder 212 on the inner sleeve 204.

The external features of the collet 3 are formed by the mould halves 201, which are withdrawn radially and by the manifold 202, which is withdrawn axially in a manner well known in the art.

The formation of the internal features of the collet is described below with reference to FIG. 17A. This shows a cross-section through one leg 35 of the collet. From the innermost edge 39, the inner diameter of the collet increases gradually forming a ramp 213. Axially spaced from the ramp 213 is the outer tooth 37, the inward bulge 37A and the inner tooth 36. The inner tooth 36 is formed at the junction between the end part 210 and the intermediate part 211 of the second core part 206. Similarly, the outer tooth 37 is formed at an interface between the first core mould portion 205 and the intermediate portion 211 of the second core portion 206. The ramp 213 is formed by a frustoconical face 214 on the first core mould part 205.

Figures 17, 17A:
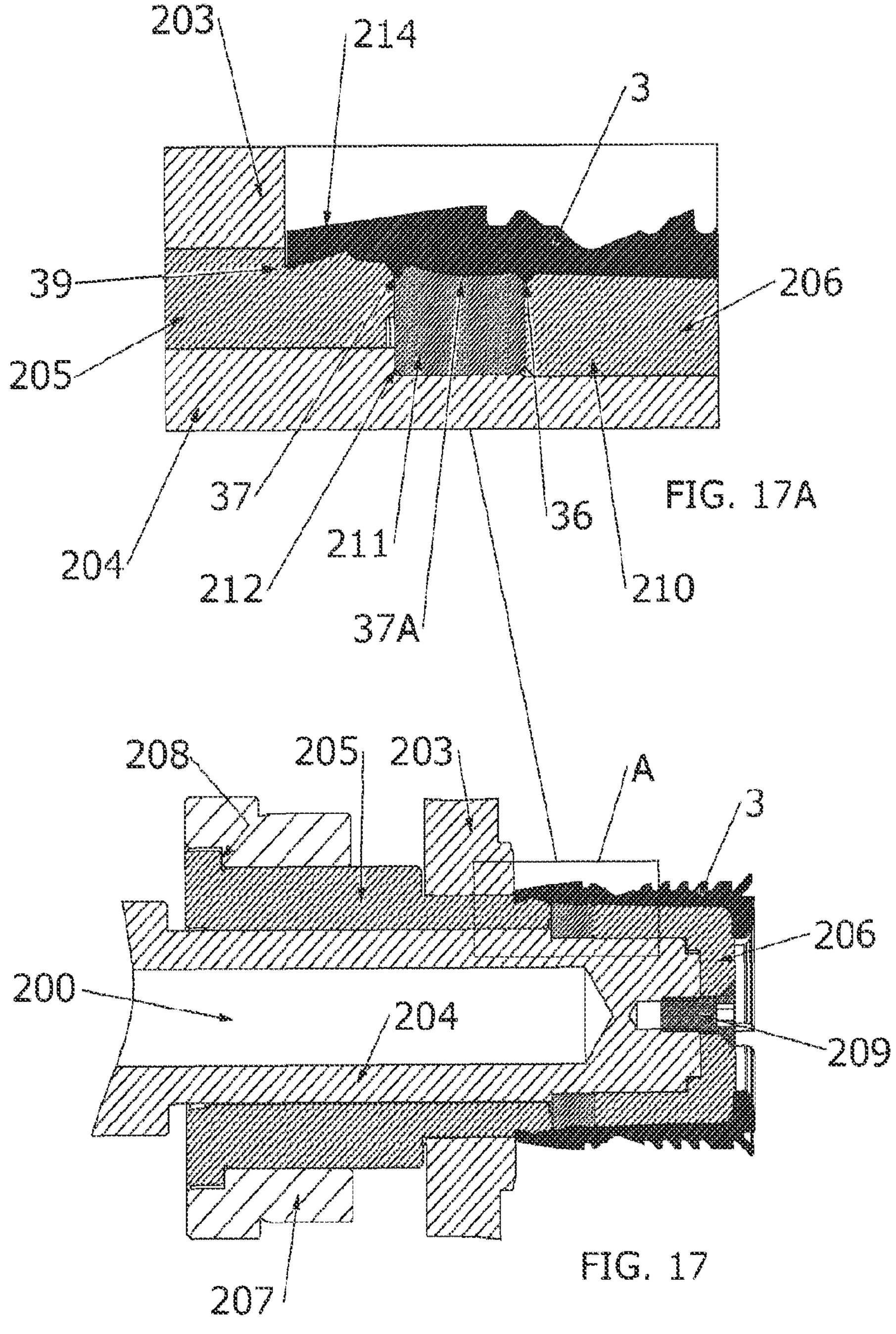
FIG. 17 is a cross-section through the axial core and collet in the moulding position shown in FIG. 16 in which the mould body has been retracted away from the core.
FIG. 17A shows the rectangle A in FIG. 17.

With the mould components in a closed configuration shown in FIGS. 17 and 17A, plastic is injected into the mould cavity via the manifold 202 thereby forming the collet 3. Once the plastic has set to the required degree, the mould opening sequence begins.

Figures 18, 18A:
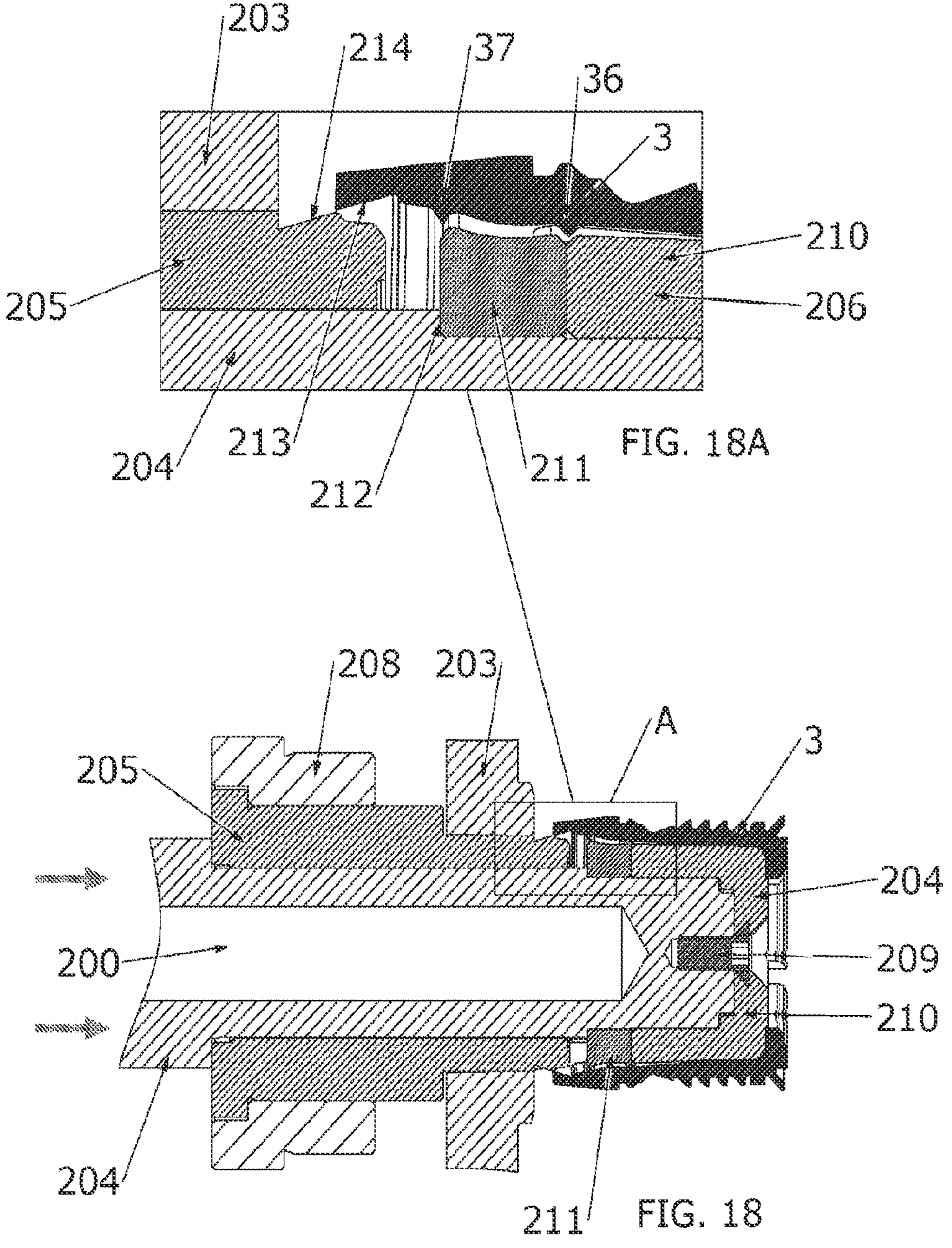
FIG. 18 is a view similar to FIG. 17 in which the first part of the core has been axially withdrawn.
FIG. 18A shows the rectangle A in FIG. 18.

As a first step, the ring 207 is moved away from the mould cavity causing the first core mould part 205 to slide along the axial core 200 to the position shown in FIGS. 18 and 18A. The frustoconical face 214 rides up the ramp 213 causing the legs 35 to be splayed radially outwardly. This peels the inner face of the collet 3 away from the second core mould part 206 and, in particular, away from the intermediate part 211.

Figures 19, 19A:
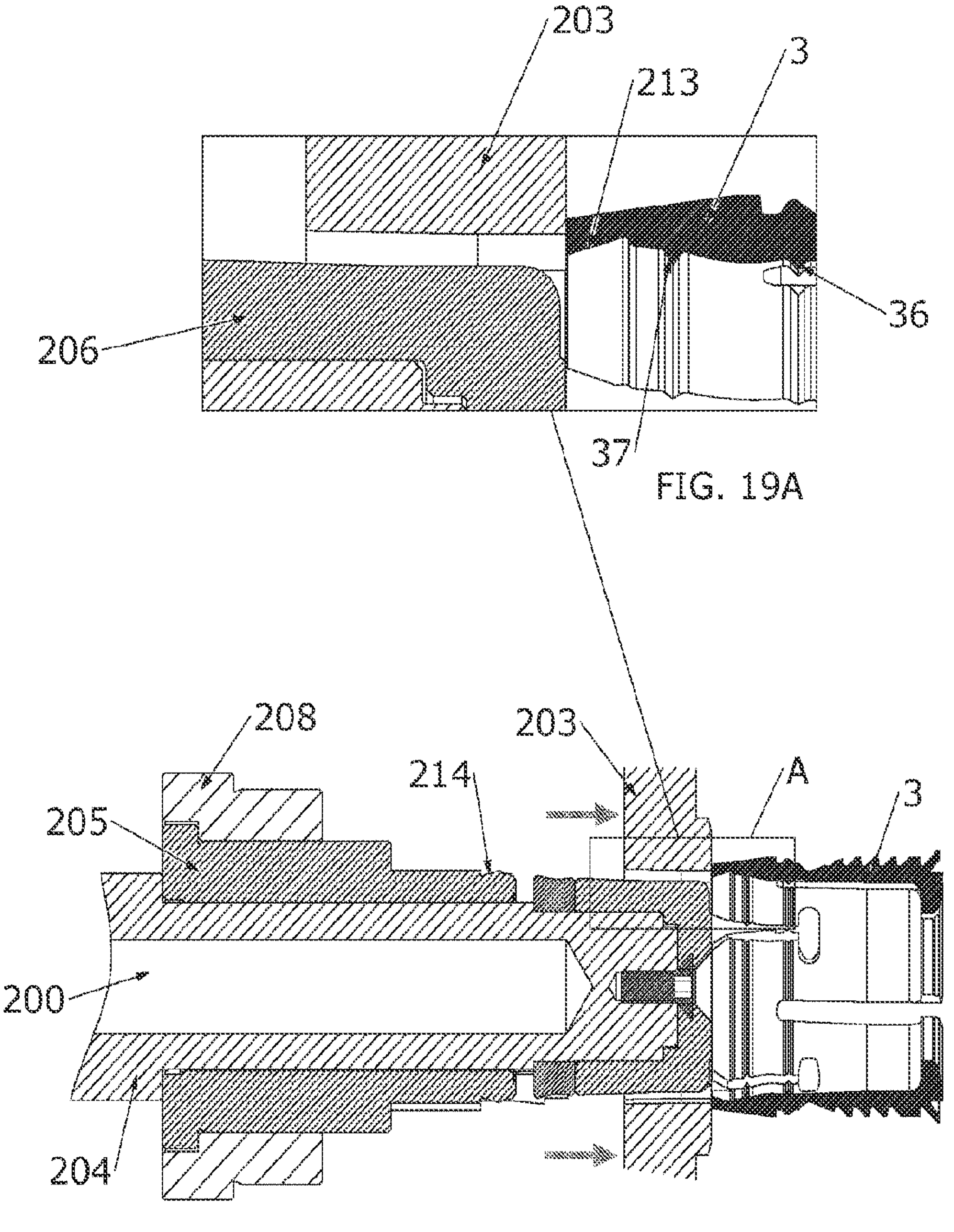
FIG. 19 is a view similar to FIG. 17 in which the first part of the core has been full retracted from the mould cavity with the ejector plate in its forward position.
FIG. 19A shows the rectangle A in FIG. 19.
Figures 20, 20A, 21, 21A, 22, 22A:
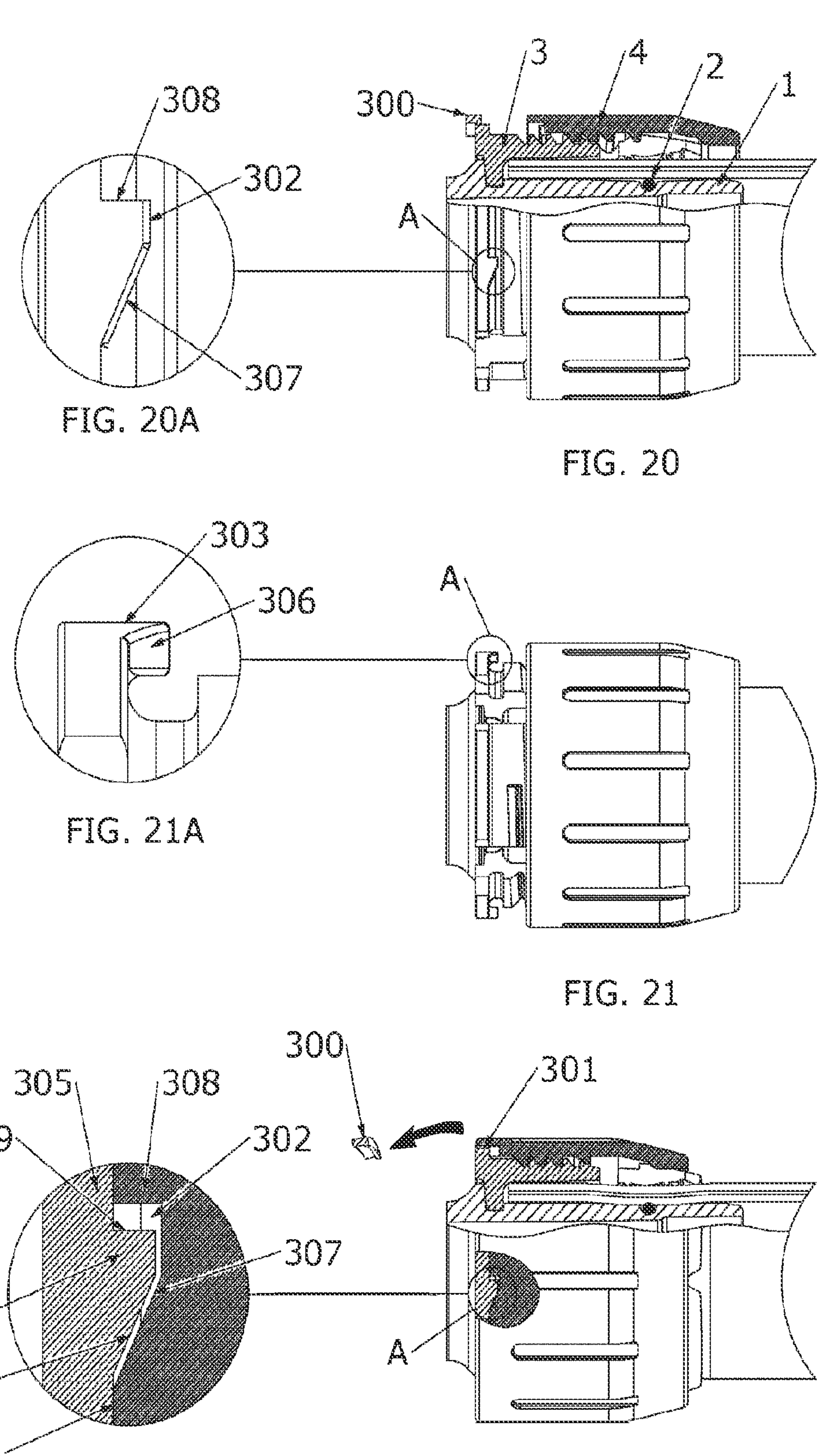
FIG. 20 is a partial cross-section showing a third example of a connector in an unlocked configuration with a pipe inserted.
FIG. 20A shows the detail in circle A in FIG. 20.
FIG. 21 is a side view of the connector and pipe of FIG. 20.
FIG. 21A shows the detail in circle A in FIG. 21.
FIG. 22 is a partial sectional view of the third connector and pipe in a locked position.
FIG. 22A shows the detail in circle A in FIG. 22.

From there, the ejector plate 203 is moved to the right thereby pushing on the end of the collet 3 to displace it from the second core mould part 206 as shown in FIGS. 19 and 19A. Because of the above described interaction between the ramp 213 and frustoconical face 214, the inner tooth 37 is clear of the intermediate part 211. Further, in the position shown in FIG. 18A, the left flank of the inner tooth 36 is separated slightly from the intermediate part 211. Initial movement of the ejector plate 203 pushing the collet 3 to the right, causing the right flank of the inner tooth 39 to ride over the outermost edge of the end part 210 thereby providing further separation between the collet 3 and the second core mould part 206, this time in the vicinity of the end part 210. This whole process happens very quickly, such that there is a relatively smooth overlapping movement between the two radially outward deflections caused by the ramp 213 with a conical face 214 and the inner tooth 316 with the end part 201 and the axial movement caused by the ejector plate 203.

The method provides a way of moulding a relatively complex geometry on the inner face of the collet, in a manner which can be simply and reliably demoulded.

A third example of a connector will now be described with reference FIGS. 20 to 24.

The body 1, O-ring 2, collet 3 and locking cap 4 broadly operate as described with reference to the first and second examples. The third example relates to a modification which can provide an audible click to a user to indicate that the connector has been fully made up.

With a plastic connector, it can be difficult to get a loud enough noise to provide a reliable audible signal to an operator that the connector has reached its fully made up position. In order to address this, the third example is provided with a break-off tab 300, which projects radially outwardly at the opposite end of the collet to which it is attached by a frangible connection. When the locking cap 4 is in the fully locked position shown in FIG. 22, its end 301 will deflect and would ultimately break off the break-off tab 300 emitting an audible click. There may be more than one such break-off tab 300 on the collet, but one is sufficient to provide the audible indication.

The collet and cap are also provided with the end stop mechanism in the form of saw teeth recesses 302, which are formed in an inner face of the connector 4 so that they are open towards the end 301 of the locking cap 4 and complimentary saw teeth 303 on the collet. As the locking cap 4 nears its end position, the end face 304 in the vicinity of the saw teeth recesses 302 engages with a complimentary face 305 on the collet. Ramp surfaces 306, 307 of the complimentary saw teeth ride up one another, thereby causing an increased resistance to further movement of the locking ring 4 until the saw teeth 303 drop into the saw teeth recesses 302 and ultimately their complimentary end faces 308, 309 provide an end stop to prevent further rotation of the locking cap 4 with respect to the collet 3.

Thus, a user tightening the locking cap 4 would begin to feel an increased resistance, followed by a removal of this resistance as the teeth 303 drop into the recesses 302 which will be accompanied by the click as the break-off tab is severed. This will happen shortly before the locking cap 4 reaches the end stops 308,309. This provides tactile and audible feedback to indicate to the operator that the connection has been fully made up while the end stops 308,309 prevents any further overtightening. The operator can therefore confidently and reliably make up the connection that will not cause them to be over stressed.

A similar idea is shown in the fourth example which will now be described with reference to FIGS. 25 to 30. In this case, there is a break-off tab 400, which is close to the end of the collet, but spaced from the end of the collet which is provided with an end flange 401. Again, this is engaged by the end of the connector 4, which breaks off the tab. However, once broken off, the break-off tab 400 is retained between the locking cap 4 and the end flange 401 as shown in FIG. 27. This avoids loose pieces of plastic in the vicinity of the connector joint which might become caught up in other components and provide unwanted waste and/or a hazard which might interfere with other connectors.

In place of the saw tooth arrangement, this example has an array of bumps 402, 403 facing inwardly from an inner face of the distal end of the connector 4 and a corresponding array of bumps 403 projecting outwardly from a complimentary outer face of the collet 3. As the locking cap 4 approaches its locked position, the user will feel and hear a vibration as the bumps 402, 403 ride over one another. This will occur shortly before the break-off tab is engaged by the locking cap 4 which will then produce an audible click as the tab is broken off and retained as set out above. Further movement of the locking cap 4 is then prevented by its engagement with the flange 401 and the intervening break-off tab 400. Thus, again, the user is provided with a series of audible and tactile signals indicating that they are approaching and have reached the fully locked position, whereupon further movement of the cap 4 is prevented.

The invention claimed is:

1. A pipe connector comprising:

a hollow body having a central throughway defining an axis, the hollow body comprising a tubular part at at least one end, the tubular part having an outer face to seal, in use, with an inner diameter of a pipe placed over the tubular part;

a collet fitted over the tubular part of the hollow body so as to be axially fixed with respect to the hollow body and being spaced from the tubular part to form a cavity for the pipe, the inner face of the collet having at least one tooth to grip the pipe, in use, and the outer face of the collet having a first screw thread; and a locking cap fitted over the collet and having an inner face with a second screw thread which is complementary to the to the first screw thread, wherein screwing the locking cap onto the collet from an unlocked configuration to a locked configuration causes inward deflection of the collet to press, in use, the collet onto the pipe and the pipe onto the tubular part to seal the interface between the hollow body and the pipe;

wherein in the unlocked configuration, an inner diameter of a first constriction at an open end of the collet is greater than an inner diameter of a distal part of the collet that receives the pipe;

wherein the tubular part has a groove retaining an elastically deformable sealing ring to provide the seal, in use, with the inner diameter of the pipe placed over the tubular part; and wherein the groove is provided with a projecting feature which provides an enhanced leakage path around the seal in the unlocked configuration.

2. A pipe connector comprising:

a hollow body having a central throughway defining an axis, the hollow body comprising a tubular part at at least one end, the tubular part having an outer face to seal, in use, with an inner diameter of a pipe placed over the tubular part;

a collet fitted over the tubular part of the hollow body so as to be axially fixed with respect to the hollow body and being spaced from the tubular part to form a cavity for the pipe, the inner face of the collet having at least one tooth to grip the pipe, in use, and the outer face of the collet having a first screw thread; and a locking cap captive on the collet and having an inner face with a second screw thread which is complementary to the first screw thread, wherein screwing the locking cap onto the collet from an unlocked configuration to a locked configuration causes inward deflection of the collet to press, in use, the collet onto the pipe and the pipe onto the tubular part to seal the interface between the hollow body and the pipe;

wherein the tubular part has a groove retaining an elastically deformable sealing ring to provide the seal, in use, with the inner diameter of the pipe placed over the tubular part; and wherein the groove is provided with a projecting feature which provides an enhanced leakage path around the seal in the unlocked configuration.

3. The pipe connector according to claim 2, wherein, when in the unlocked configuration, an inner diameter of a first constriction at an open end of the collet is greater than an inner diameter of a part of the collet that receives the pipe distally of a sealing ring.

4. The pipe connector according to claim 2, wherein the collet has two sets of teeth, the two sets of teeth being axially spaced from one another.

5. The pipe connector according to claim 4, wherein between the two sets of teeth, an inner wall of the collet bulges inwardly.

6. The pipe connector according to claim 2, wherein, in use, in the locked configuration, there is no axial movement between the hollow body, the collet, the locking cap and the pipe.

7. The pipe connector according to claim 2, wherein the pipe connector is capable of maintaining the seal when exposed to a continuous temperature of 70° C., 80° C. and 90° C.

8. The pipe connector according to claim 2, wherein the locking cap and the hollow body have an end stop to prevent them from being unscrewed beyond the unlocked configuration.

9. The pipe connector according to claim 2, wherein a distal end of the collet protrudes from the locking cap and is visible to a user in the unlocked configuration and is covered by the locking cap or protrudes to a lesser extent in the locked configuration.

10. The pipe connector according to claim 9, wherein a proximal end of the collet is visible at a proximal end of the pipe connector in the locked configuration, in use, with the pipe in place.

11. The pipe connector according to claim 2, wherein the collet and locking cap are different colours.

12. The pipe connector according to claim 9, wherein the collet has at least one through slot at its distal end which is exposed in the locked and unlocked configurations allowing an end of the pipe to be visible, in use, through the at least one through slot when the pipe connector is in the locked and unlocked configurations with the pipe inserted.

13. The pipe connector according to claim 2, wherein the collet and the locking cap have complementary end stops to prevent overtightening.

14. The pipe connector according to claim 2, wherein the collet and the locking cap have complementary features to produce a sound when the locking cap reaches the locked configuration.

15. A pipe connector comprising:

a hollow body having a central throughway defining an axis, the hollow body comprising a tubular part at at least one end, the tubular part having an outer face to seal, in use, with an inner diameter of a pipe placed over the tubular part;

a collet fitted over the tubular part of the hollow body so as to be axially fixed with respect to the hollow body and being spaced from the tubular part to form a cavity for the pipe, the inner face of the collet having at least one tooth to grip the pipe, in use, and the outer face of the collet having a first screw thread; and a locking cap having an inner face with a second screw thread which is complementary to the to the first screw thread, wherein screwing the locking cap onto the collet from an unlocked configuration to a locked configuration causes inward deflection of the collet to press, in use, the collet onto the pipe and the pipe onto the tubular part to seal the interface between the hollow body and the pipe;

wherein the collet and locking cap have complementary features to produce an audible click when the locking cap reaches the locked configuration;

wherein the tubular part has a groove retaining an elastically deformable sealing ring to provide the seal, in use, with the inner diameter of the pipe placed over the tubular part; and wherein the groove is provided with a projecting feature which provides an enhanced leakage path around the seal in the unlocked configuration.

16. The pipe connector according to claim 15, wherein the complementary features include a break off tab configured to be broken off as the locking cap reaches the locked configuration.

17. The pipe connector according to claim 16, wherein the collet and the locking cap are configured to retain the broken off tab in the pipe connector.

* * * * *